United States Patent
Hirzallah et al.

(10) Patent No.: US 12,069,682 B2
(45) Date of Patent: Aug. 20, 2024

(54) TRANSMISSION CONFIGURATION INDICATOR STATES FOR SUBBANDS

(71) Applicant: QUALCOMM Incorporated, San Diego, CA (US)

(72) Inventors: Mohammed Ali Mohammed Hirzallah, San Diego, CA (US); Arumugam Chendamarai Kannan, San Diego, CA (US); Srinivas Yerramalli, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/447,643

(22) Filed: Sep. 14, 2021

(65) Prior Publication Data
US 2023/0084678 A1   Mar. 16, 2023

(51) Int. Cl.
*H04W 72/23*   (2023.01)
*H04L 5/00*   (2006.01)
*H04W 72/0453*   (2023.01)

(52) U.S. Cl.
CPC .......... *H04W 72/23* (2023.01); *H04L 5/0094* (2013.01); *H04W 72/0453* (2013.01)

(58) Field of Classification Search
CPC .............. H04W 72/23; H04W 72/0453; H04L 5/0094; H04L 5/001; H04L 5/0044; H04L 5/0053

See application file for complete search history.

(56) References Cited

U.S. PATENT DOCUMENTS

| | | | |
|---|---|---|---|
| 2019/0342907 A1* | 11/2019 | Huang | H04L 5/0048 |
| 2020/0396633 A1* | 12/2020 | Tseng | H04W 76/27 |
| 2021/0028843 A1* | 1/2021 | Zhou | H04B 7/063 |
| 2021/0084625 A1 | 3/2021 | Ryu et al. | |
| 2021/0126761 A1 | 4/2021 | Venugopal et al. | |
| 2023/0180199 A1* | 6/2023 | Jung | H04L 1/0038 370/329 |

FOREIGN PATENT DOCUMENTS

| | | | | |
|---|---|---|---|---|
| WO | WO-2021067703 A1 * | 4/2021 | .......... | H04L 5/0096 |
| WO | WO-2022047122 A1 * | 3/2022 | | |

OTHER PUBLICATIONS

International Search Report and Written Opinion—PCT/US2022/075062—ISA/EPO—Nov. 10, 2022.

* cited by examiner

*Primary Examiner* — Will W Lin
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a first radio resource control (RRC) configuration message that is associated with a first subband and that indicates a first set of transmission configuration indicator (TCI) states for use on the first subband. The UE may further receive, from the base station, a second RRC configuration message that is associated with a second subband included in the wideband channel and that indicates a second set of TCI states for use on the second subband. As an alternative, the UE may receive, from the base station, an RRC configuration message that includes at least a first list of first TCI states associated with a first subband and a second list of second TCI states associated with a second subband. Numerous other aspects are described.

30 Claims, 12 Drawing Sheets

TRANSMISSION CONFIGURATION INDICATOR STATES FOR SUBBANDS

FIELD OF THE DISCLOSURE

Aspects of the present disclosure generally relate to wireless communication and to techniques and apparatuses for using transmission configuration indicator states for subbands.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The memory may store instructions executable by the one or more processors to cause the UE to receive, from a base station, a first radio resource control (RRC) configuration message that is associated with a first subband included in a wideband channel between the UE and the base station and that indicates a first set of transmission configuration indicator (TCI) states for use on the first subband. The memory may store instructions executable by the one or more processors to further cause the UE to receive, from the base station, a second RRC configuration message that is associated with a second subband included in the wideband channel and that indicates a second set of TCI states for use on the second subband.

Some aspects described herein relate to an apparatus for wireless communication at a base station. The apparatus may include a memory and one or more processors coupled to the memory. The memory may store instructions executable by the one or more processors to cause the base station to transmit, to a UE, a first RRC configuration message that is associated with a first subband included in a wideband channel between the UE and the base station and that indicates a first set of TCI states for use on the first subband. The memory may store instructions executable by the one or more processors to further cause the base station to transmit, to the UE, a second RRC configuration message that is associated with a second subband included in the wideband channel and that indicates a second set of TCI states for use on the second subband.

Some aspects described herein relate to an apparatus for wireless communication at a UE. The apparatus may include a memory and one or more processors coupled to the memory. The memory may store instructions executable by the one or more processors to cause the UE to receive, from a base station, an RRC configuration message that includes at least a first list of first TCI states associated with a first subband and a second list of second TCI states associated with a second subband. The memory may store instructions executable by the one or more processors to further cause the UE to receive, from the base station, an indication of the first subband and the second subband.

Some aspects described herein relate to an apparatus for wireless communication at a base station. The apparatus may include a memory and one or more processors coupled to the memory. The memory may store instructions executable by the one or more processors to cause the base station to transmit, to a UE, an RRC configuration message that includes at least a first list of first TCI states associated with a first subband and a second list of second TCI states associated with a second subband. The memory may store instructions executable by the one or more processors to further cause the base station to transmit, to the UE, an indication of the first subband and the second subband.

Some aspects described herein relate to a method of wireless communication performed by a UE. The method may include receiving, from a base station, a first RRC configuration message that is associated with a first subband included in a wideband channel between the UE and the base station and that indicates a first set of TCI states for use on the first subband. The method may further include receiving, from the base station, a second RRC configuration message that is associated with a second subband included in the wideband channel and that indicates a second set of TCI states for use on the second subband.

Some aspects described herein relate to a method of wireless communication performed by a base station. The method may include transmitting, to a UE, a first RRC configuration message that is associated with a first subband included in a wideband channel between the UE and the base station and that indicates a first set of TCI states for use on the first subband. The method may further include transmitting, to the UE, a second RRC configuration message that is associated with a second subband included in the wideband channel and that indicates a second set of TCI states for use on the second subband.

Some aspects described herein relate to a method of wireless communication performed by a UE. The method may include receiving, from a base station, an RRC configuration message that includes at least a first list of first TCI states associated with a first subband and a second list of second TCI states associated with a second subband. The method may further include receiving, from the base station, an indication of the first subband and the second subband.

Some aspects described herein relate to a method of wireless communication performed by a base station. The method may include transmitting, to a UE, an RRC configuration message that includes at least a first list of first TCI states associated with a first subband and a second list of second TCI states associated with a second subband. The method may further include transmitting, to the UE, an indication of the first subband and the second subband.

Some aspects described herein relate to an apparatus for wireless communication. The apparatus may include means for receiving, from a base station, a first RRC configuration message that is associated with a first subband included in a wideband channel between the apparatus and the base station and that indicates a first set of TCI states for use on the first subband. The apparatus may further include means for receiving, from the base station, a second RRC configuration message that is associated with a second subband included in the wideband channel and that indicates a second set of TCI states for use on the second subband.

Some aspects described herein relate to an apparatus for wireless communication. The apparatus may include means for transmitting, to a UE, a first RRC configuration message that is associated with a first subband included in a wideband channel between the UE and the apparatus and that indicates a first set of TCI states for use on the first subband. The apparatus may further include means for transmitting, to the UE, a second RRC configuration message that is associated with a second subband included in the wideband channel and that indicates a second set of TCI states for use on the second subband.

Some aspects described herein relate to an apparatus for wireless communication. The apparatus may include means for receiving, from a base station, an RRC configuration message that includes at least a first list of first TCI states associated with a first subband and a second list of second TCI states associated with a second subband. The apparatus may further include means for receiving, from the base station, an indication of the first subband and the second subband.

Some aspects described herein relate to an apparatus for wireless communication. The apparatus may include means for transmitting, to a UE, an RRC configuration message that includes at least a first list of first TCI states associated with a first subband and a second list of second TCI states associated with a second subband. The apparatus may further include means for transmitting, to the UE, an indication of the first subband and the second subband.

Some aspects described herein relate to a non-transitory computer-readable medium that stores one or more instructions for wireless communication by a UE. The one or more instructions, when executed by one or more processors of the UE, may cause the UE to receive, from a base station, a first RRC configuration message that is associated with a first subband included in a wideband channel between the UE and the base station and that indicates a first set of TCI states for use on the first subband. The one or more instructions, when executed by one or more processors of the UE, may further cause the UE to receive, from the base station, a second RRC configuration message that is associated with a second subband included in the wideband channel and that indicates a second set of TCI states for use on the second subband.

Some aspects described herein relate to a non-transitory computer-readable medium that stores one or more instructions for wireless communication by a base station. The one or more instructions, when executed by one or more processors of the base station, may cause the base station to transmit, to a UE, a first RRC configuration message that is associated with a first subband included in a wideband channel between the UE and the base station and that indicates a first set of TCI states for use on the first subband. The one or more instructions, when executed by one or more processors of the base station, may further cause the base station to transmit, to the UE, a second RRC configuration message that is associated with a second subband included in the wideband channel and that indicates a second set of TCI states for use on the second subband.

Some aspects described herein relate to a non-transitory computer-readable medium that stores one or more instructions for wireless communication by a UE. The one or more instructions, when executed by one or more processors of the UE, may cause the UE to receive, from a base station, an RRC configuration message that includes at least a first list of first TCI states associated with a first subband and a second list of second TCI states associated with a second subband. The one or more instructions, when executed by one or more processors of the UE, may further cause the UE to receive, from the base station, an indication of the first subband and the second subband.

Some aspects described herein relate to a non-transitory computer-readable medium that stores one or more instructions for wireless communication by a base station. The one or more instructions, when executed by one or more processors of the base station, may cause the base station to transmit, to a UE, an RRC configuration message that includes at least a first list of first TCI states associated with a first subband and a second list of second TCI states associated with a second subband. The one or more instructions, when executed by one or more processors of the base station, may further cause the base station to transmit, to the UE, an indication of the first subband and the second subband.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
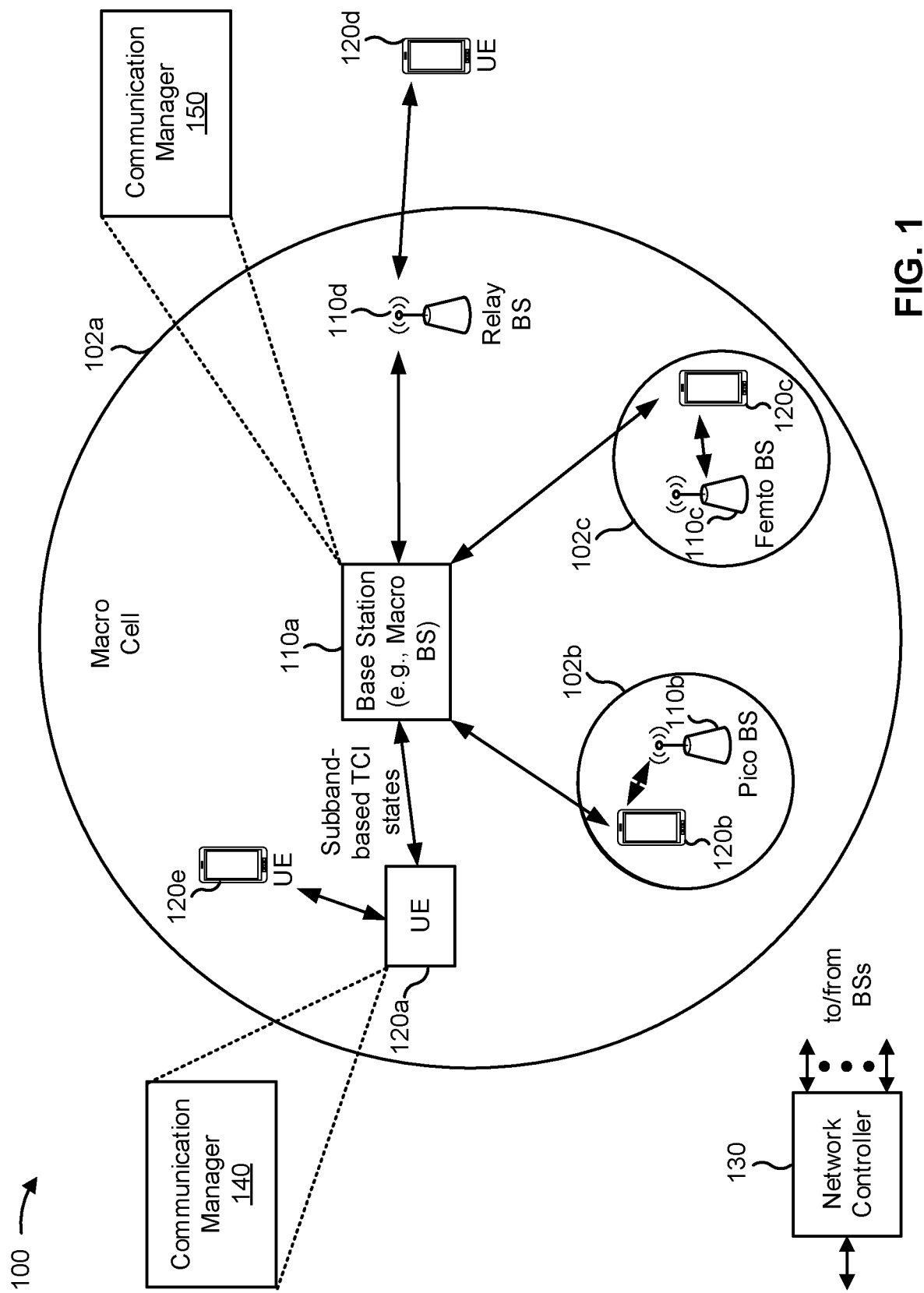
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

The UE 120 may receive a downlink transmission (e.g., from the base station 110) using a transmission configuration, such as a transmission configuration indicator (TCI) state (e.g., represented by a TTCI-State data structure, as defined in 3GPP specifications and/or another standard). For example, the base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. Additionally, a downlink beam, such as a BS transmit beam or a UE receive beam, may be associated with a TCI state. A TCI state may indicate a directionality or a characteristic of the downlink beam, such as one or more quasi-co-location (QCL) properties of the downlink beam. For example, a QCL property may be indicated using a qcl-Type indicator within a QCL-Info data structure, as defined in 3GPP specifications and/or another standard. A QCL property may include, for example, a Doppler shift, a Doppler spread, an average delay, a delay spread, or spatial receive parameters, among other examples. In some aspects, a TCI state may be further associated with an antenna port, an antenna panel, and/or a TRP. A TCI state may be associated with one downlink reference signal set (for example, a synchronization signal block (SSB) and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). For example, the downlink reference signal may be indicated using a referenceSignal indicator, within a QCL-Info data structure, as defined in 3GPP specifications and/or another standard. In cases where the QCL type indicates spatial receive parameters, the QCL type may correspond to analog receive beamforming parameters of a UE receive beam at the UE 120.

The base station 110 may configure a set of TCI states for use on a physical downlink shared channel (PDSCH) as well as a subset of those TCI states for use on a physical downlink control channel (PDCCH). The base station 110 may use radio resource control (RRC) messages to provide the set of TCI states for the PDSCH and/or the subset of those TCI states for the PDCCH. For the PDSCH, the base station 110 may transmit a medium access control (MAC) layer control element (MAC-CE) to activate a subset of the TCI states for use on the PDSCH and then schedule (e.g., using downlink control information (DCI)) a particular one of those activated TCI states for a PDSCH message. Similarly, for the PDCCH, the base station 110 may transmit a MAC-CE to activate, for a PDCCH message, one TCI state from the subset of the TCI states for use on the PDCCH.

In some aspects, the UE 120 may include a communication manager 140. As described in more detail elsewhere herein, the communication manager 140 may receive, from the base station 110, a first RRC configuration message that is associated with a first subband included in a wideband channel between the UE 120 and the base station 110 and that indicates a first set of TCI states for use on the first subband. The communication manager 140 may further receive, from the base station 110, a second RRC configuration message that is associated with a second subband included in the wideband channel and that indicates a second set of TCI states for use on the second subband. As an alternative, the communication manager 140 may receive, from the base station 110, an RRC configuration message that includes at least a first list of first TCI states associated with a first subband and a second list of second TCI states associated with a second subband. The communication manager 140 may further receive, from the base station 110, an indication of the first subband and the second subband. Additionally, or alternatively, the communication manager 140 may perform one or more other operations described herein.

Similarly, in some aspects, the base station 110 may include a communication manager 150. As described in more detail elsewhere herein, the communication manager 150 may transmit, to the UE 120, a first RRC configuration message that is associated with a first subband included in a wideband channel between the UE 120 and the base station 110 and that indicates a first set of TCI states for use on the first subband. The communication manager 150 may further transmit, to the UE 120, a second RRC configuration message that is associated with a second subband included in the wideband channel and that indicates a second set of TCI states for use on the second subband. As an alternative, the communication manager 150 may transmit, to the UE 120, an RRC configuration message that includes at least a first list of first TCI states associated with a first subband and a second list of second TCI states associated with a second subband. The communication manager 150 may further transmit, to the UE 120, an indication of the first subband and the second subband. Additionally, or alternatively, the communication manager 150 may perform one or more other operations described herein.

As indicated above, FIG. 1 is provided as an example. Other examples may differ from what is described with regard to FIG. 1.

Figure 2:
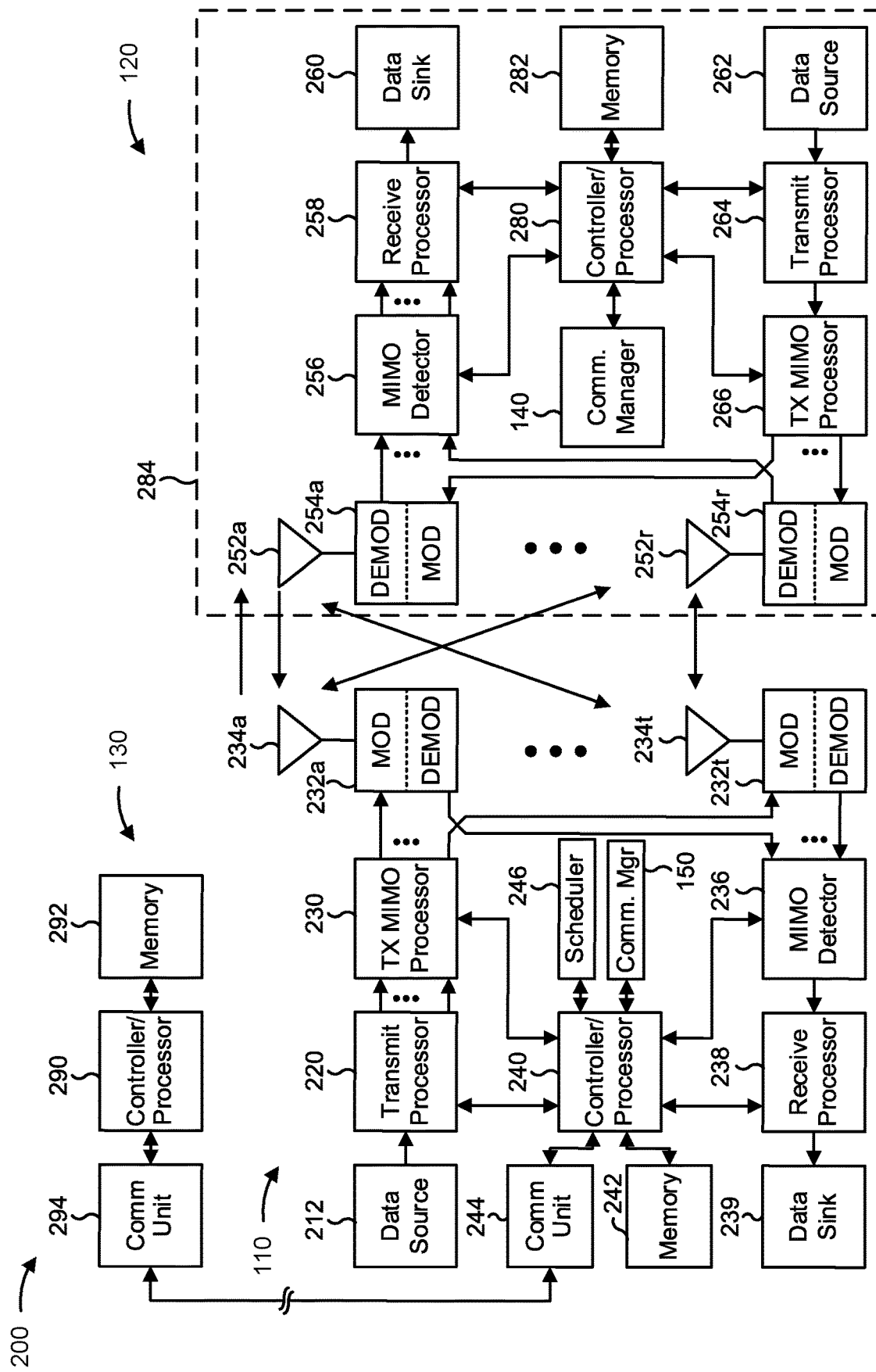
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the base station 110, the controller/processor 280 of the UE 120, and/or any other component(s) of FIG. 2 may perform one or more techniques associated with using TCI states for subbands, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 1100 of FIG. 11) may include means for receiving, from a base station (e.g., the base station 110 and/or apparatus 1200 of FIG. 12), a first RRC configuration message that is associated with a first subband included in a wideband channel between the UE and the base station and that indicates a first set of TCI states for use on the first subband; and/or means for receiving, from the base station, a second RRC configuration message that is associated with a second subband included in the wideband channel and that indicates a second set of TCI states for use on the second subband. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282. As an alternative, the UE may include means for receiving, from the base station, an RRC configuration message that includes at least a first list of first TCI states associated with a first subband and a second list of second TCI states associated with a second subband; and/or means for receiving, from the base station, an indication of the first subband and the second subband. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., the base station 110 and/or apparatus 1200 of FIG. 12) may include means for transmitting, to a UE (e.g., the UE 120 and/or apparatus 1100 of FIG. 11), a first RRC configuration message that is associated with a first subband included in a wideband channel between the UE and the base station and that indicates a first set of TCI states for use on the first subband; and/or means for transmitting, to the UE, a second RRC configuration message that is associated with a second subband included in the wideband channel and that indicates a second set of TCI states for use on the second subband. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. As an alternative, the base station may include means for transmitting, to the UE, an RRC configuration message that includes at least a first list of first TCI states associated with a first subband and a second list of second TCI states associated with a second subband; and/or means for transmitting, to the UE, an indication of the first subband and the second subband. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
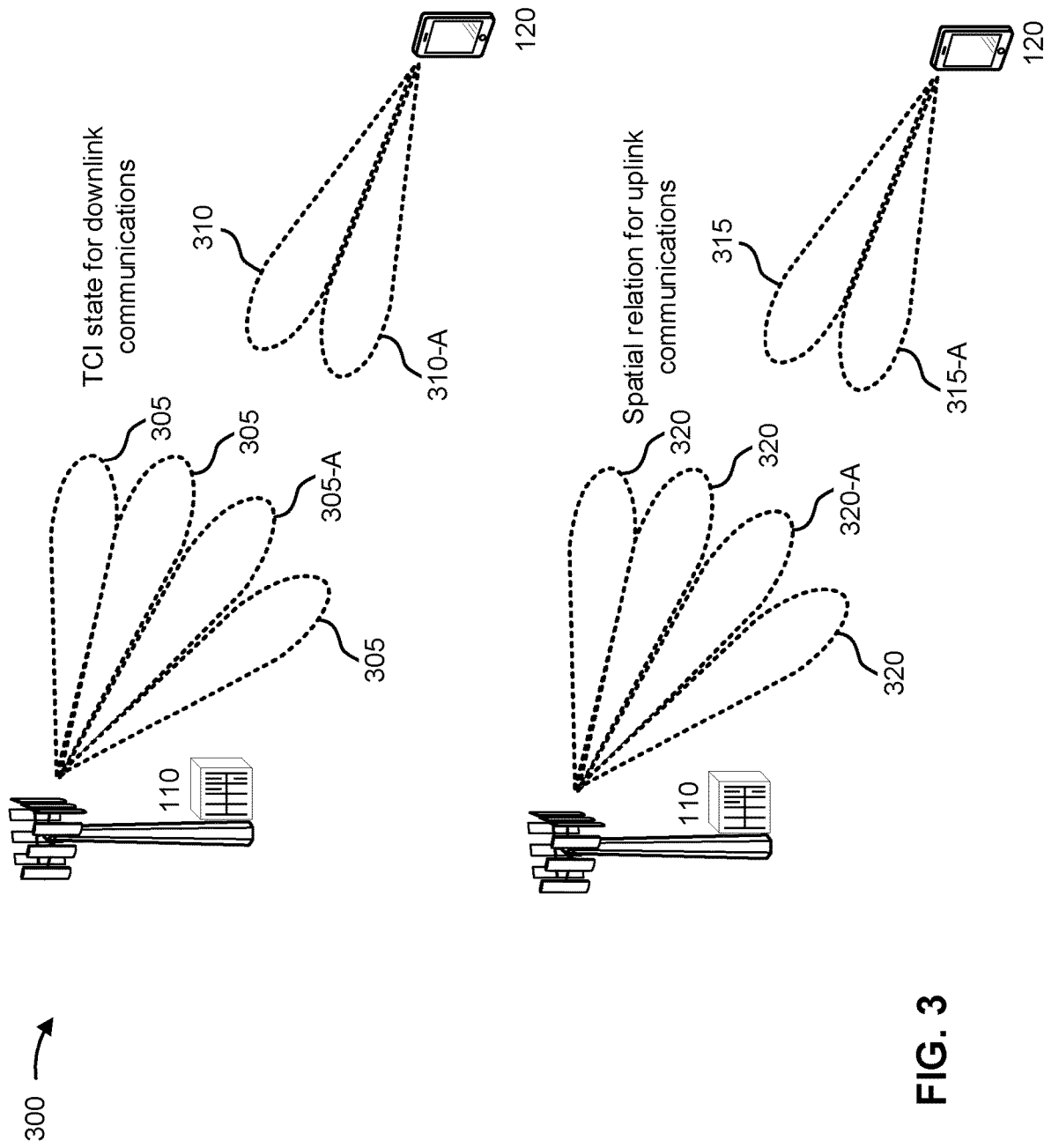
FIG. 3 is a diagram illustrating an example of using beams for communications between a base station and a UE, in accordance with the present disclosure.

FIG. 3 is a diagram illustrating an example 300 of using beams for communications between a base station and a UE, in accordance with the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

As described in connection with FIG. 1, a downlink beam, such as a BS transmit beam 305 or a UE receive beam 310, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 305 may be associated with a SSB, and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

As indicated above, FIG. 3 is provided as an example. Other examples may differ from what is described with respect to FIG. 3.

Figure 4:
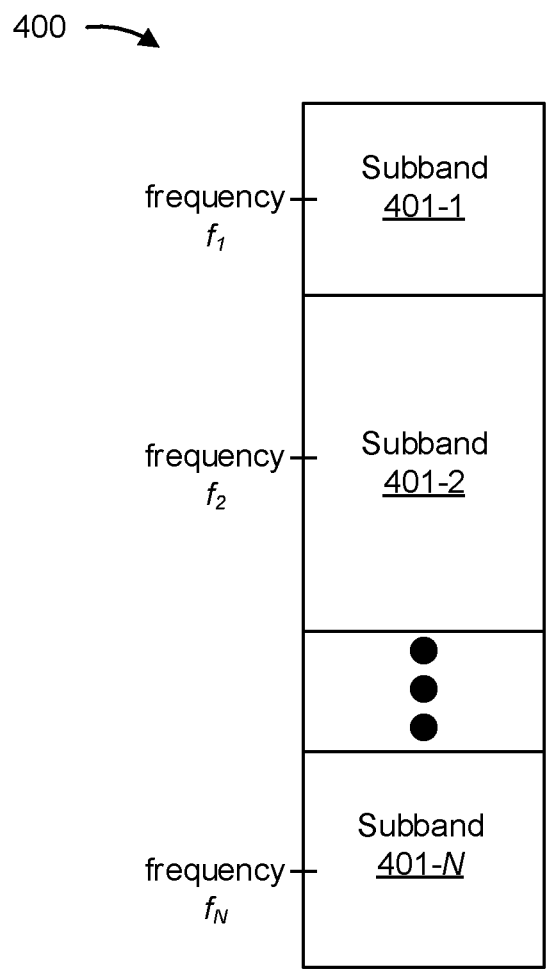
FIG. 4 is a diagram illustrating an example of subbands in a wideband channel, in accordance with the present disclosure.

FIG. 4 is a diagram illustrating an example 400 of subbands in a wideband channel, in accordance with the present disclosure. Example 400 includes a set of frequency resources used on a wideband channel (e.g., between a UE and a base station). The wideband channel may include a downlink channel, such as a PDSCH or a PDCCH, or an uplink channel, such as a physical uplink shared channel (PUSCH) or a physical uplink control channel (PUCCH).

The set of frequency resources may be included in, or correspond to, a bandwidth part (BWP). As used herein, a "bandwidth part" or "BWP" may refer to a contiguous set of physical resource blocks (PRBs), where each PRB includes a set of frequencies corresponding to one or more subcarriers. A "subcarrier" may refer to a frequency based at least in part on a "carrier" frequency, and subcarriers may be aggregated to convey information wirelessly (e.g., using OFDM symbols and/or other RF symbols).

As further shown in FIG. 4, the UE and the base station may use one or more subbands when communicating on the wideband channel. As used herein, a "subband" may refer to a subset of frequencies within a larger set of frequencies on a "band." A subband is smaller than a BWP and includes a subset of a set of frequency resources used on a wideband channel.

Accordingly, in example 400, the wideband channel is associated with a quantity of subbands (e.g., represented by N in example 400), shown as subband 401-1, subband 401-2, . . . , subband 401–N in FIG. 4. Each subband may be centered on a frequency. For example, as shown in FIG. 4, subband 401-1 is centered on a frequency represented by $f_1$, subband 401-2 is centered on a frequency represented by $f_2$, and so on with subband 401–N being centered on a frequency represented by $f_N$.

When using subbands, a UE and a base station are more prone to beam squinting. For example, when the base station is transmitting on a subband but drifts away from a central frequency associated with the subband, a direction associated with a beamformed communication on that subband may shift significantly. Beam squinting results in decreased reliability and/or quality of communications between the UE and the base station. As a result, the UE and the base station are more likely to drop communications and thus use retransmissions (sometimes even multiple retransmissions), which wastes power, processing resources, and network resources at the UE and the base station. Retransmissions also increase interference with other nearby devices (such as other UEs in a same serving cell or in neighbor cells).

In 3GPP specifications (and other standards), TCI states are generally associated with wideband channels. For example, TCI states may be associated with BWPs. Accordingly, when the UE or the base station is transmitting on a subband, the UE or the base station, respectively, may apply a TCI state that is optimized for a different subband associated with the wideband channel. As a result, beam squinting is very likely to occur, which results in wasted power and processing resources at the UE and the base station, as described above.

Some techniques and apparatuses described herein enable a base station (e.g., base station 110) to associate different subbands with different TCI states using RRC configuration messages. As a result, the base station 110 and/or a UE (e.g., UE 120) reduce beam squinting during transmission by applying TCI states that are optimized by subband. Accordingly, reliability and/or quality of communications between the UE 120 and the base station 110 are increased, and, as a result, the UE 120 and the base station 110 are less likely to drop communications and use retransmissions. Using fewer retransmissions conserves power and processing resources at the UE 120 and the base station 110. Using fewer retransmissions also decreases interference with other nearby devices (such as other UEs in a same serving cell or in neighbor cells).

As indicated above, FIG. 4 is provided as an example. Other examples may differ from what is described with respect to FIG. 4.

Figure 5:
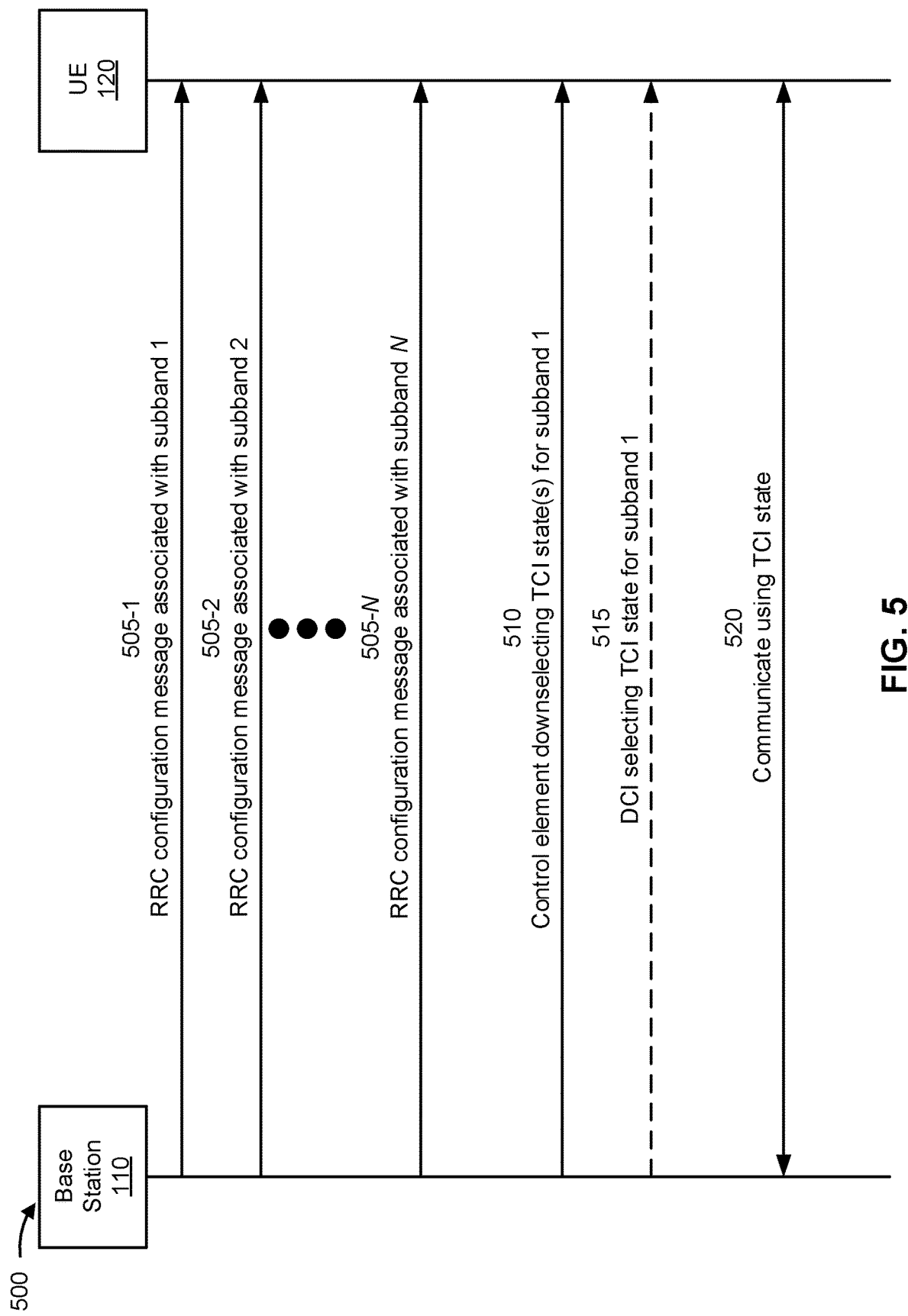
FIGS. 5 and 6 are diagrams illustrating examples associated with using transmission configuration indicator (TCI) states for subbands, in accordance with the present disclosure.

FIG. 5 is a diagram illustrating an example 500 associated with using TCI states for subbands, in accordance with the present disclosure. As shown in FIG. 5, a base station 110 and a UE 120 may communicate with one another (e.g., on a wireless communication network, such as wireless network 100 of FIG. 1).

As shown by reference number 505-1, the base station 110 may transmit, and the UE 120 may receive, a first RRC configuration message that is associated with a first subband included in a wideband channel between the UE 120 and the base station 110 (e.g., as described in connection with FIG. 4) and that indicates a first set of TCI states for use on the first subband.

In some aspects, the base station 110 may transmit an RRCReconfigPerSubBand data structure (e.g., as defined in 3GPP specifications and/or another standard), where each TCI-State indicated in a Tci-StatesPDCCH-ToAddList data structure (e.g., as defined in 3GPP specifications and/or another standard) is associated with the first subband. For example, the UE 120 may determine that the TCI states indicated in the Tci-StatesPDCCH-ToAddList data structure are associated with the first subband because the RRC configuration message is associated with the first subband. Accordingly, the first set of TCI states may include one or more TCI states associated with a control channel, such as a PDCCH.

Additionally, or alternatively, each TCI-State indicated in a Tci-StatesToAddModList data structure (e.g., as defined in 3GPP specifications and/or another standard) may be associated with the first subband. For example, the UE 120 may determine that the TCI states indicated in the Tci-StatesToAddModList data structure are associated with the first subband because the RRC configuration message is associated with the first subband. Accordingly, the first set of TCI states may include one or more TCI states associated with a data channel, such as a PDSCH.

As shown by reference number 505-2, the base station 110 may transmit, and the UE 120 may receive, a second RRC configuration message that is associated with a second subband included in the wideband channel and that indicates a second set of TCI states for use on the second subband.

In some aspects, the base station 110 may transmit an additional RRCReconfigPerSubBand data structure (e.g., as defined in 3GPP specifications and/or another standard), where each TCI-State indicated in a Tci-StatesPDCCH-ToAddList data structure (e.g., as defined in 3GPP specifications and/or another standard) is associated with the second subband. For example, the UE 120 may determine that the TCI states indicated in the Tci-StatesPDCCH-ToAddList data structure are associated with the second subband because the RRC configuration message is associated with the second subband. Accordingly, the second set of TCI states may include one or more TCI states associated with a control channel, such as a PDCCH.

Additionally, or alternatively, each 7TCI-State indicated in a Tci-StatesToAddModList data structure (e.g., as defined in 3GPP specifications and/or another standard) may be associated with the second subband. For example, the UE 120 may determine that the TCI states indicated in the Tci-StatesToAddModList data structure are associated with the second subband because the RRC configuration message is associated with the second subband. Accordingly, the second set of TCI states may include one or more TCI states associated with a data channel, such as a PDSCH.

The base station 110 may similarly transmit one or more additional RRC configuration messages, each associated with a different subband of one or more additional subbands included in the wideband channel. For example, there may be a maximum quantity of subbands (e.g., represented by N in FIG. 5) such that the base station 110 transmits up to N RRC configuration messages (e.g., as shown by reference number 505-N). The maximum quantity of subbands may be programmed (and/or otherwise preconfigured) into the base station 110 and the UE 120 (e.g., according to 3GPP specifications and/or another standard). Additionally, or alternatively, the base station 110 may determine the maximum quantity of subbands and indicate the determined maximum quantity of subbands to the UE 120. In a combinatory example, the base station 110 may select the maximum quantity of subbands from a plurality of possible maxima programmed (and/or otherwise preconfigured) into the base station 110 and the UE 120 (e.g., according to 3GPP specifications and/or another standard).

In some aspects, a quantity of TCI states indicated by each RRC configuration message does not exceed a maximum quantity of TCI states. For example, the maximum quantity of TCI states may be represented by K such that each RRC configuration message does not indicate more than K states. The maximum may apply to all TCI states included in an RRC configuration message (e.g., to all TCI states indicated in a Tci-StatesPDCCH-ToAddList data structure, a Tci-StatesToAddModList data structure, or a combination thereof). As an alternative, the maximum may apply separately to TCI states associated with a data channel and TCI states associated with a control channel (e.g., to TCI states indicated in a Tci-StatesPDCCH-ToAddList data structure and separately to TCI states indicated in a Tci-StatesToAddModList data structure).

The maximum quantity of TCI states may be programmed (and/or otherwise preconfigured) into the base station 110 and the UE 120 (e.g., according to 3GPP specifications and/or another standard). Additionally, or alternatively, the base station 110 may determine the maximum quantity of TCI states and indicate the determined maximum quantity of TCI states to the UE 120. In a combinatory example, the base station 110 may select the maximum quantity of TCI states from a plurality of possible maxima programmed (and/or otherwise preconfigured) into the base station 110 and the UE 120 (e.g., according to 3GPP specifications and/or another standard).

As shown by reference number 510, the base station 110 may transmit, and the UE 120 may receive, a control element (e.g., a MAC-CE) that indicates a subset of the first set of TCI states for use on the first subband. For example, the MAC-CE may indicate no more than a maximum quantity of TCI states (e.g., represented by J) from the Tci-StatesToAddModList data structure in the RRCReconfigPerSubBand data structure that is associated with the first subband. Although 3GPP specifications currently use J=8, smaller maxima may be used (e.g., seven, six, and so on) or larger maxima may be used (e.g., nine, ten, and so on). The UE 120 may therefore determine that the TCI state(s) indicated in the control element are associated with the first subband because the corresponding RRC configuration message is associated with the first subband. Accordingly, the subset of the first set of TCI states may be associated with a data channel, such as a PDSCH. In another example, the MAC-CE may indicate one TCI state from the Tci-StatesPDCCH-ToAddList data structure in the RRCReconfigPerSubBand data structure that is associated with the first subband. The UE 120 may therefore determine that the TCI state indicated in the control element is associated with the first subband because the corresponding RRC configuration message is associated with the first subband. Accordingly, the subset of the first set of TCI states may be associated with a control channel, such as a PDCCH.

As an alternative, the base station 110 may transmit, and the UE 120 may receive, a control element (e.g., a MAC-CE) that indicates a subset of: the first set of TCI states, the second set of TCI states, or a combination thereof, for use on the first subband or the second subband. For example, the RRC configuration message associated with the first subband and the RRC configuration message associated with the second subband may both indicate a same set of TCI states in the Tci-StatesPDCCH-ToAddList data structure and/or in the Tci-StatesToAddModList data structure. Accordingly, the TCI state(s) indicated by the control element may be at least partially subband-agnostic.

The base station 110 may similarly transmit control elements indicating subsets of TCI states for use on other subbands.

In aspects where the control element indicates more than one TCI state, and as shown by reference number 515, the base station 110 may transmit, and the UE 120 may receive, control information (e.g., DCI) that indicates a TCI state within the subset of the first set of TCI states for use on the first subband. For example, the DCI (e.g., DCI format 1_1 as defined by 3GPP specifications and/or another standard) may indicate a TCI state using a codepoint associated with the TCI state from the control element. The UE 120 may therefore determine that the TCI state indicated in the control information is associated with the first subband because the corresponding RRC configuration message that configured the TCI state is associated with the first subband.

In aspects where the TCI state(s) indicated by the control element are at least partially subband-agnostic (e.g., as described in connection with reference number 510), the control information may further indicate the first subband. For example, the DCI (e.g., DCI format 1_1 as defined by 3GPP specifications and/or another standard) may include a field that indicates the first subband of a plurality of subbands configured for the UE 120.

The base station 110 may similarly transmit control information indicating TCI states for use on other subbands.

As shown by reference number 520, the base station and the UE 120 may communicate using the TCI state (e.g., indicated by the control information and/or the control element). For example, the UE 120 may receive data or other signals using the TCI state (e.g., on a PDSCH, a PDCCH, and/or another downlink channel). As an alternative, the base station 110 may receive data or other signals using the TCI state (e.g., on a PUSCH, a PUCCH, and/or another uplink channel).

By using techniques as described in connection with FIG. 5, the base station 110 associates different subbands with different TCI states using RRC configuration messages. As a result, the base station 110 and/or the UE 120 reduce beam squinting during transmission by applying TCI states that are optimized by subband. Accordingly, reliability and/or quality of communications between the UE 120 and the base station 110 are increased, and, as a result, the UE 120 and the base station 110 are less likely to drop communications and use retransmissions. Using fewer retransmissions conserves power and processing resources at the UE 120 and the base station 110. Using fewer retransmissions also decreases interference with other nearby devices (such as other UEs in a same serving cell or in neighbor cells).

As indicated above, FIG. 5 is provided as an example. Other examples may differ from what is described with respect to FIG. 5.

Figure 6:
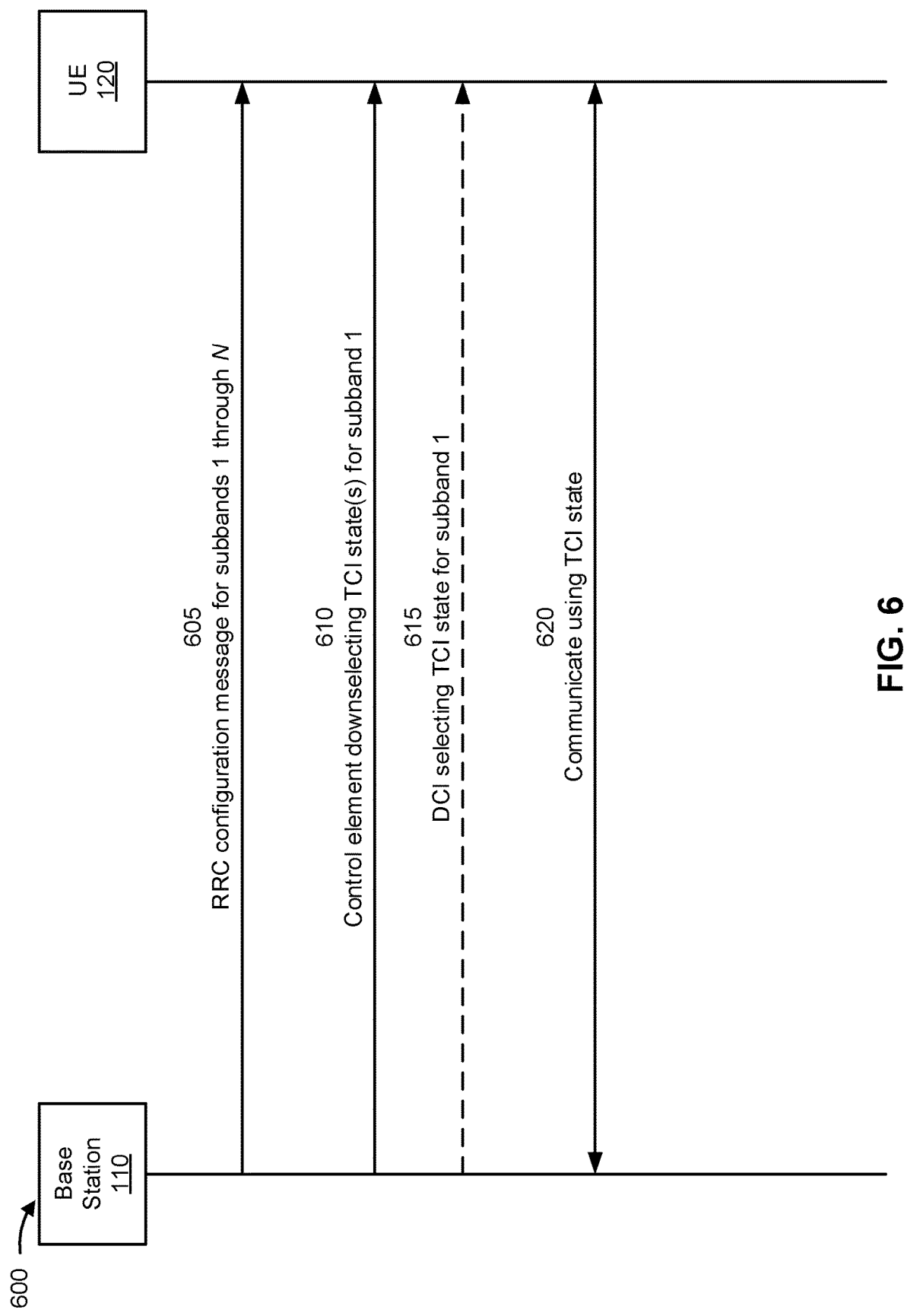

FIG. 6 is a diagram illustrating an example 600 associated with using TCI states for subbands, in accordance with the present disclosure. As shown in FIG. 6, a base station 110 and a UE 120 may communicate with one another (e.g., on a wireless communication network, such as wireless network 100 of FIG. 1).

As shown by reference number 605, the base station 110 may transmit, and the UE 120 may receive, an RRC configuration message that includes at least a first list of first TCI states associated with a first subband included in a wideband channel between the UE 120 and the base station 110 (e.g., as described in connection with FIG. 4) and a second list of second TCI states associated with a second subband included in the wideband channel.

In some aspects, the base station 110 may transmit an RRCReconfig data structure (e.g., as defined in 3GPP specifications and/or another standard) including a first Tci-StatesPDCCH-ToAddListPerSB-0 data structure (e.g., as defined in 3GPP specifications and/or another standard) that is associated with the first subband and a second Tci-StatesPDCCH-ToAddListPerSB-1 data structure (e.g., as defined in 3GPP specifications and/or another standard) that is associated with the second subband. For example, the UE 120 may determine that the first list of TCI states indicated in the Tci-StatesPDCCH-ToAddListPerSB-0 data structure is associated with the first subband because the data structure is associated with the first subband. Accordingly, the first list of TCI states may include one or more TCI states associated with a control channel, such as a PDCCH. Similarly, the UE 120 may determine that the second list of TCI states indicated in the Tci-StatesPDCCH-ToAddListPerSB-1 data structure is associated with the second subband because the data structure is associated with the second subband. Accordingly, the second list of TCI states may include one or more TCI states associated with a control channel, such as a PDCCH.

Additionally, or alternatively, the RRC configuration message may include a first Tci-StatesToAddModListPerSB-0 data structure (e.g., as defined in 3GPP specifications and/or another standard) that is associated with the first subband and a second Tci-StatesToAddModListPerSB-1 data structure (e.g., as defined in 3GPP specifications and/or another standard) that is associated with the second subband. For example, the UE 120 may determine that a third list of TCI states indicated in the Tci-StatesToAddModListPerSB-0 data structure is associated with the first subband because the data structure is associated with the first subband. Accordingly, the third list of TCI states may include one or more TCI states associated with a data channel, such as a PDSCH. Similarly, the UE 120 may determine that a fourth list of TCI states indicated in the Tci-StatesToAddModListPerSB-1 data structure is associated with the second subband because the data structure is associated with the second subband. Accordingly, the fourth list of TCI states may include one or more TCI states associated with a control channel, such as a PDCCH.

The RRC configuration message may similarly include one or more additional lists of TCI states, each list associated with a different subband of one or more additional subbands included in the wideband channel. For example, there may be a maximum quantity of subbands (e.g., represented by N in FIG. 6) such that the base station 110 transmits a configuration message with up to N lists (or up to 2N lists, with no more than N lists associated with a control channel and no more than N lists associated with a data channel). The maximum quantity of subbands may be programmed (and/or otherwise preconfigured) into the base station 110 and the UE 120 (e.g., according to 3GPP specifications and/or another standard). Additionally, or alternatively, the base station 110 may determine the maximum quantity of subbands and indicate the determined maximum quantity of subbands to the UE 120. In a combinatory example, the base station 110 may select the maximum quantity of subbands from a plurality of possible maxima programmed (and/or otherwise preconfigured) into the base station 110 and the UE 120 (e.g., according to 3GPP specifications and/or another standard).

In some aspects, a quantity of TCI states indicated by each list does not exceed a maximum quantity of TCI states. For example, the maximum quantity of TCI states may be represented by K such that each list does not indicate more than K states.

The maximum quantity of TCI states may be programmed (and/or otherwise preconfigured) into the base station 110 and the UE 120 (e.g., according to 3GPP specifications and/or another standard). Additionally, or alternatively, the base station 110 may determine the maximum quantity of TCI states and indicate the determined maximum quantity of TCI states to the UE 120. In a combinatory example, the base station 110 may select the maximum quantity of TCI states from a plurality of possible maxima programmed (and/or otherwise preconfigured) into the base station 110 and the UE 120 (e.g., according to 3GPP specifications and/or another standard).

Additionally, the base station 110 may transmit, and the UE 120 may receive, an indication of the first subband and the second subband. In some aspects, indication of the first subband may be included in the first TCI states, and the indication of the second subband may be included in the second TCI states. For example, each TCI-State data structure associated with a corresponding one of the first TCI states may include an index (e.g., an SB-index) associated with the first subband. In some aspects, the index may indicate that the TCI state is associated with more than one subband. As an alternative, each TCI-State data structure associated with a corresponding one of the first TCI states may include a paired index (e.g., a TOI-state-id data structure paired with an SB-index data structure) that indicates an identifier of the TCI state and associates the TCI state with the first subband. In some aspects, the paired index may indicate that the TCI state is associated with more than one subband.

Additionally, or alternatively, the indication of the first subband and the second subband may be included in the RRC configuration message. For example, the RRC configuration message may include a data structure, separate from the lists, that indicates the first subband the second subband.

The base station 110 may similarly transmit one or more additional indications of one or more additional subbands included in the wideband channel.

As shown by reference number 610, the base station 110 may transmit, and the UE 120 may receive, a control element (e.g., a MAC-CE) that indicates a sublist of one or more first TCI states, from the first list, for use on the first subband. For example, the MAC-CE may indicate up to eight TCI states from the Tci-StatesToAddModListPerSB-0 data structure in the RRCReconfig data structure. The UE 120 may therefore determine that the TCI state(s) indicated in the control element are associated with the first subband because the corresponding data structure is associated with the first subband. Accordingly, the subset of the first set of TCI states may be associated with a data channel, such as a PDSCH. In another example, the MAC-CE may indicate one TCI state from the Tci-StatesPDCCH-ToAddListPerSB-0 data structure in the RRCReconfig data structure. The UE 120 may therefore determine that the TCI state indicated in the control element is associated with the first subband because the corresponding data structure is associated with the first subband. Accordingly, the subset of the first set of TCI states may be associated with a control channel, such as a PDCCH.

As an alternative, when the indication of the first subband is separate from the lists included in the RRC configuration message, the TCI state(s) indicated by the control element may be at least partially subband-agnostic. For example, the base station 110 may transmit, and the UE 120 may receive, a control element (e.g., a MAC-CE) that indicates a sublist of: one or more first TCI states from the first list, one or more second TCI states from the second list, or a combination thereof, for use on the first subband or the second subband. Accordingly, the TCI state(s) indicated by the control element may be at least partially subband-agnostic.

In some aspects, the control element may further indicate the first subband such that the TCI state(s) are not subband-agnostic. For example, the MAC-CE may include an identifier associated with the first subband (e.g., an SB ID) in addition to or in lieu of an identifier associated with the BWP for the wideband channel (e.g., a BWP ID).

The base station 110 may similarly transmit control elements indicating subsets of TCI states for use on other subbands.

In aspects where the control element indicates more than one TCI state, and as shown by reference number 615, the base station 110 may transmit, and the UE 120 may receive, control information (e.g., DCI) that indicates a TCI state within the sublist for use on the first subband. For example, the DCI (e.g., DCI format 1_1 as defined by 3GPP specifications and/or another standard) may indicate a TCI state using a codepoint associated with the TCI state from the control element. The UE 120 may therefore determine that the TCI state indicated in the control information is associated with the first subband because the corresponding list from the RRC configuration message that indicated the TCI state is associated with the first subband. Additionally, or alternatively, the UE 120 may determine that the TCI state indicated in the control information is associated with the first subband because the corresponding control element indicated the first subband (e.g., as described in connection with reference number 610).

In aspects where the TCI state(s) indicated by the control element are at least partially subband-agnostic (e.g., as described in connection with reference number 610), the control information may further indicate the first subband. For example, the DCI (e.g., DCI format 1_1 as defined by 3GPP specifications and/or another standard) may include a field that indicates the first subband of a plurality of subbands configured for the UE 120.

The base station 110 may similarly transmit control information indicating TCI states for use on other subbands. As shown by reference number 620, the base station and the UE 120 may communicate using the TCI state (e.g., indicated by the control information and/or the control element). For example, the UE 120 may receive data or other signals using the TCI state (e.g., on a PDSCH, a PDCCH, and/or another downlink channel). As an alternative, the base station 110 may receive data or other signals using the TCI state (e.g., on a PUSCH, a PUCCH, and/or another uplink channel).

By using techniques as described in connection with FIG. 6, the base station 110 associates different subbands with different TCI states using RRC configuration messages. As a result, the base station 110 and/or the UE 120 reduce beam squinting during transmission by applying TCI states that are optimized by subband. Accordingly, reliability and/or quality of communications between the UE 120 and the base station 110 are increased, and, as a result, the UE 120 and the base station 110 are less likely to drop communications and use retransmissions. Using fewer retransmissions conserves power and processing resources at the UE 120 and the base station 110. Using fewer retransmissions also decreases interference with other nearby devices (such as other UEs in a same serving cell or in neighbor cells).

As indicated above, FIG. 6 is provided as an example. Other examples may differ from what is described with respect to FIG. 6.

Figure 7:
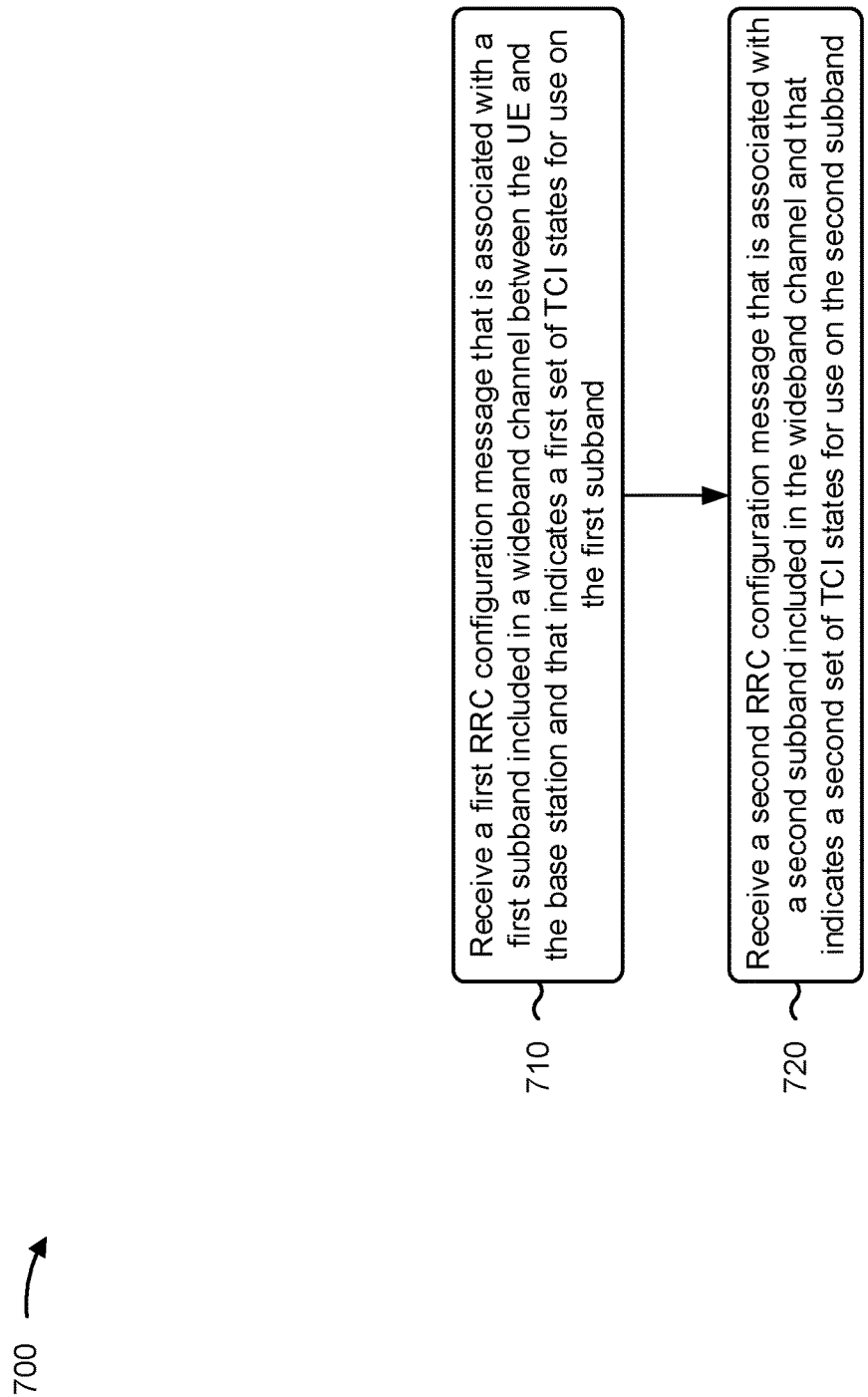
FIGS. 7, 8, 9, and 10 are diagrams illustrating example processes associated with using TCI states for subbands, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 1100 of FIG. 11) performs operations associated with TCI states for subbands.

As shown in FIG. 7, in some aspects, process 700 may include receiving, from a base station (e.g., base station 110 and/or apparatus 1200 of FIG. 12), a first RRC configuration message that is associated with a first subband included in a wideband channel between the UE and the base station and that indicates a first set of TCI states for use on the first subband (block 710). For example, the UE (e.g., using communication manager 140 and/or reception component 1102, depicted in FIG. 11) may receive, from a base station, a first RRC configuration message that is associated with a first subband included in a wideband channel between the UE and the base station and that indicates a first set of TCI states for use on the first subband, as described herein.

As further shown in FIG. 7, in some aspects, process 700 may include receiving, from the base station, a second RRC configuration message that is associated with a second subband included in the wideband channel and that indicates a second set of TCI states for use on the second subband (block 720). For example, the UE (e.g., using communication manager 140 and/or reception component 1102) may receive, from the base station, a second RRC configuration message that is associated with a second subband included in the wideband channel and that indicates a second set of TCI states for use on the second subband, as described herein.

Process 700 may include additional aspects, such as any single aspect or any combination of aspects described below and/or in connection with one or more other processes described elsewhere herein.

In a first aspect, the first set of TCI states include one or more TCI states associated with a control channel and one or more additional TCI states associated with a data channel.

In a second aspect, alone or in combination with the first aspect, a quantity of TCI states indicated by each RRC configuration message does not exceed a maximum quantity of TCI states.

In a third aspect, alone or in combination with one or more of the first and second aspects, process 700 further includes receiving (e.g., using communication manager 140 and/or reception component 1102), from the base station, one or more additional RRC configuration messages, where each additional RRC configuration message is associated with an additional subband and indicates an additional set of TCI states for use on the additional subband, and a quantity of RRC configuration messages does not exceed a maximum quantity of subbands.

In a fourth aspect, alone or in combination with one or more of the first through third aspects, process 700 further includes receiving (e.g., using communication manager 140 and/or reception component 1102), from the base station, a control element that indicates a subset of the first set of TCI states for use on the first subband.

In a fifth aspect, alone or in combination with one or more of the first through fourth aspects, process 700 further includes receiving (e.g., using communication manager 140 and/or reception component 1102), from the base station, control information that indicates a TCI state within the subset of the first set of TCI states for use on the first subband.

In a sixth aspect, alone or in combination with one or more of the first through fifth aspects, process 700 further includes receiving (e.g., using communication manager 140 and/or reception component 1102), from the base station, a control element that indicates a subset of the first set of TCI states, the second set of TCI states, or a combination thereof, for use on the first subband or the second subband.

In a seventh aspect, alone or in combination with one or more of the first through sixth aspects, process 700 further includes receiving (e.g., using communication manager 140 and/or reception component 1102), from the base station, control information that indicates a TCI state within the subset and that indicates the first subband.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
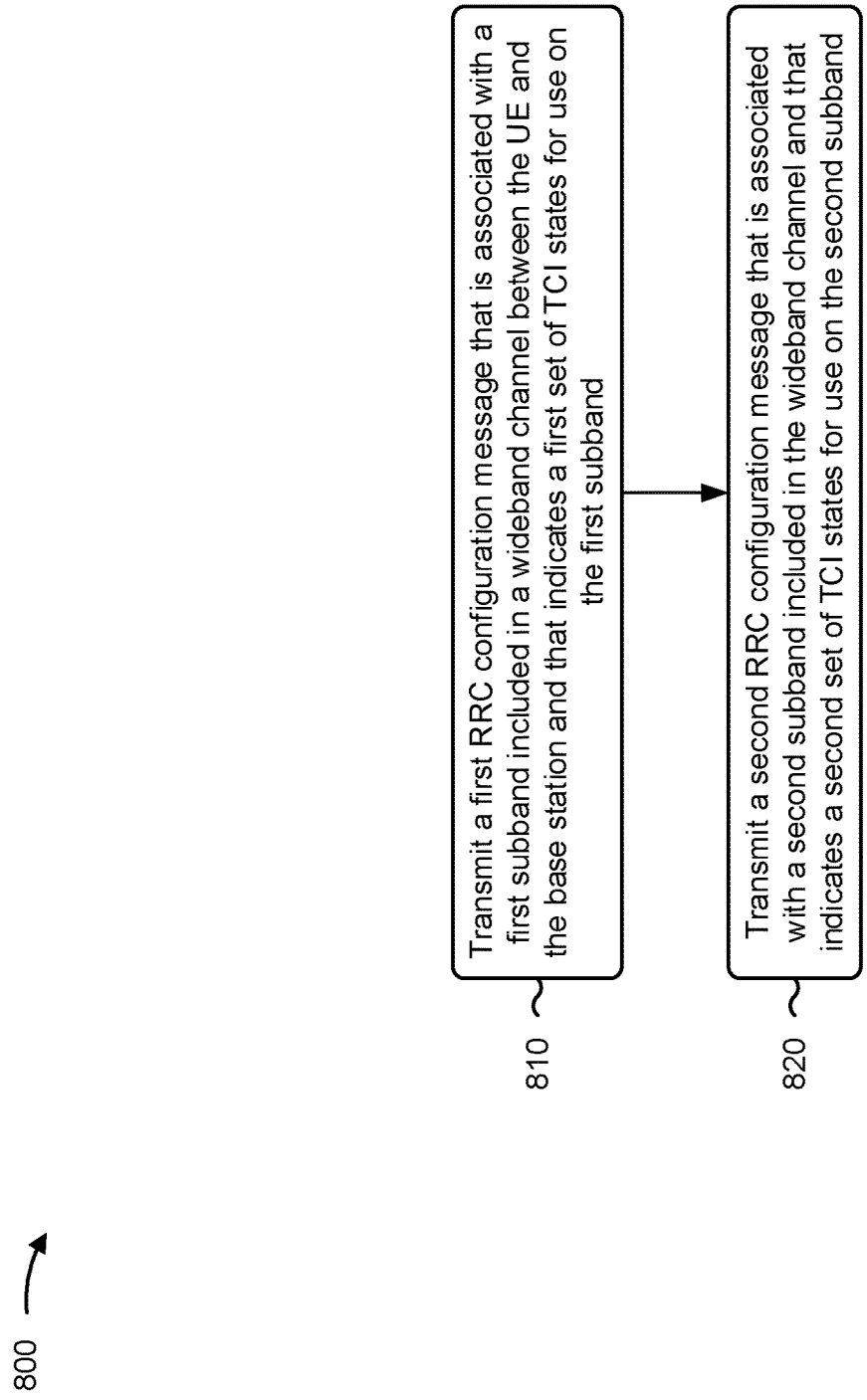

FIG. 8 is a diagram illustrating an example process 800 performed, for example, by a base station, in accordance with the present disclosure. Example process 800 is an example where the base station (e.g., base station 110 and/or apparatus 1200 of FIG. 12) performs operations associated with TCI states for subbands.

As shown in FIG. 8, in some aspects, process 800 may include transmitting, to a UE (e.g., UE 120 and/or apparatus 1100 of FIG. 11), a first RRC configuration message that is associated with a first subband included in a wideband channel between the UE and the base station and that indicates a first set of TCI states for use on the first subband (block 810). For example, the base station (e.g., using communication manager 150 and/or transmission component 1204, depicted in FIG. 12) may transmit, to a UE, a first RRC configuration message that is associated with a first subband included in a wideband channel between the UE and the base station and that indicates a first set of TCI states for use on the first subband, as described herein.

As further shown in FIG. 8, in some aspects, process 800 may include transmitting, to the UE, a second RRC configuration message that is associated with a second subband included in the wideband channel and that indicates a second set of TCI states for use on the second subband (block 820). For example, the base station (e.g., using communication manager 150 and/or transmission component 1204) may transmit, to the UE, a second RRC configuration message that is associated with a second subband included in the wideband channel and that indicates a second set of TCI states for use on the second subband, as described herein.

Process 800 may include additional aspects, such as any single aspect or any combination of aspects described below and/or in connection with one or more other processes described elsewhere herein.

In a first aspect, the first set of TCI states comprises one or more TCI states associated with a control channel and one or more additional TCI states associated with a data channel.

In a second aspect, alone or in combination with the first aspect, a quantity of TCI states indicated by each RRC configuration message does not exceed a maximum quantity of TCI states.

In a third aspect, alone or in combination with one or more of the first and second aspects, process 800 further includes transmitting (e.g., using communication manager 150 and/or transmission component 1204), to the UE, one or more additional RRC configuration messages, where each additional RRC configuration message is associated with an additional subband and indicates an additional set of TCI states for use on the additional subband, and a quantity of RRC configuration messages does not exceed a maximum quantity of subbands.

In a fourth aspect, alone or in combination with one or more of the first through third aspects, process 800 further includes transmitting (e.g., using communication manager 150 and/or transmission component 1204), to the UE, a control element that indicates a subset of the first set of TCI states for use on the first subband.

In a fifth aspect, alone or in combination with one or more of the first through fourth aspects, process 800 further includes transmitting (e.g., using communication manager 150 and/or transmission component 1204), to the UE, control information that indicates a TCI state within the subset of the first set of TCI states for use on the first subband.

In a sixth aspect, alone or in combination with one or more of the first through fifth aspects, process 800 further includes transmitting (e.g., using communication manager 150 and/or transmission component 1204), to the UE, a control element that indicates a subset of the first set of TCI states, the second set of TCI states, or a combination thereof, for use on the first subband or the second subband.

In a seventh aspect, alone or in combination with one or more of the first through sixth aspects, process 800 further includes transmitting (e.g., using communication manager 150 and/or transmission component 1204), to the UE, control information that indicates a TCI state within the subset and that indicates the first subband.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
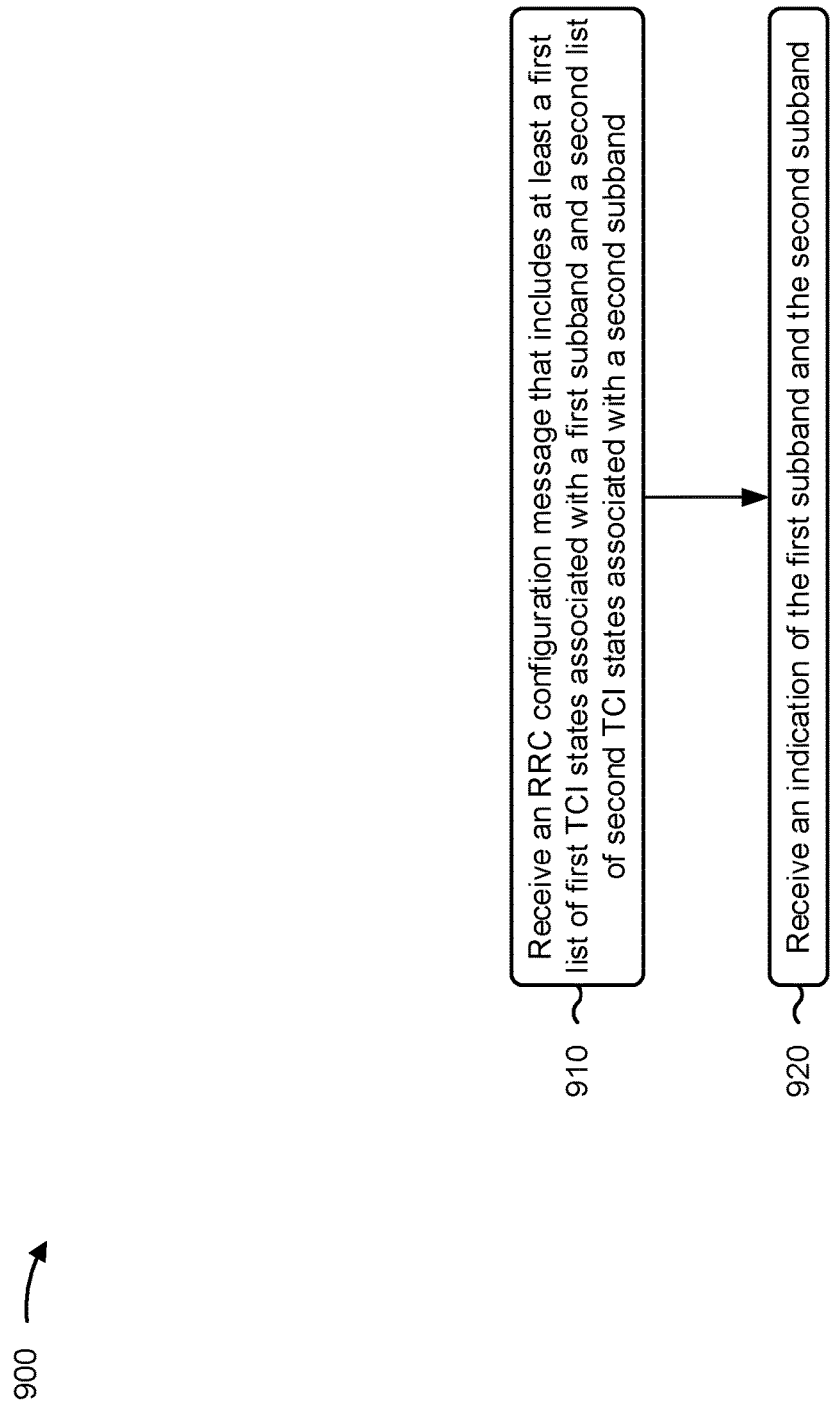

FIG. 9 is a diagram illustrating an example process 900 performed, for example, by a UE, in accordance with the present disclosure. Example process 900 is an example where the UE (e.g., UE 120 and/or apparatus 1100 of FIG. 11) performs operations associated with TCI states for subbands.

As shown in FIG. 9, in some aspects, process 900 may include receiving, from a base station (e.g., base station 110 and/or apparatus 1200 of FIG. 12), an RRC configuration message that includes at least a first list of first TCI states associated with a first subband and a second list of second TCI states associated with a second subband (block 910). For example, the UE (e.g., using communication manager 140 and/or reception component 1102, depicted in FIG. 11) may receive, from a base station, an RRC configuration message that includes at least a first list of first TCI states associated with a first subband and a second list of second TCI states associated with a second subband, as described herein.

As further shown in FIG. 9, in some aspects, process 900 may include receiving, from the base station, an indication of the first subband and the second subband (block 920). For example, the UE (e.g., using communication manager 140 and/or reception component 1102) may receive, from the base station, an indication of the first subband and the second subband, as described herein.

Process 900 may include additional aspects, such as any single aspect or any combination of aspects described below and/or in connection with one or more other processes described elsewhere herein.

In a first aspect, the first TCI states are associated with a control channel, the second TCI states are associated with the control channel, and the RRC configuration message further includes a third list of third TCI states associated with the first subband and associated with a data channel and includes a fourth list of fourth TCI states associated with the second subband and associated with the data channel.

In a second aspect, alone or in combination with the first aspect, a quantity of TCI states indicated by each list does not exceed a maximum quantity of TCI states.

In a third aspect, alone or in combination with one or more of the first and second aspects, a quantity of lists included in the RRC configuration message does not exceed a maximum quantity of subbands.

In a fourth aspect, alone or in combination with one or more of the first through third aspects, the indication of the first subband is included in the first TCI states, and the indication of the second subband is included in the second TCI states.

In a fifth aspect, alone or in combination with one or more of the first through fourth aspects, the indication of the first subband and the second subband is included in the RRC configuration message.

In a sixth aspect, alone or in combination with one or more of the first through fifth aspects, process 900 further includes receiving (e.g., using communication manager 140 and/or reception component 1102), from the base station, a control element that indicates a sublist of one or more first TCI states from the first list for use on the first subband.

In a seventh aspect, alone or in combination with one or more of the first through sixth aspects, the control element further indicates the first subband.

In an eighth aspect, alone or in combination with one or more of the first through seventh aspects, process 900 further includes receiving (e.g., using communication manager 140 and/or reception component 1102), from the base station, control information that indicates a TCI state within the sublist for use on the first subband.

In a ninth aspect, alone or in combination with one or more of the first through eighth aspects, the control information further indicates the first subband.

In a tenth aspect, alone or in combination with one or more of the first through ninth aspects, process 900 further includes receiving (e.g., using communication manager 140 and/or reception component 1102), from the base station, a control element that indicates a sublist of one or more first TCI states from the first list, one or more second TCI states from the second list, or a combination thereof, for use on the first subband or the second subband.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
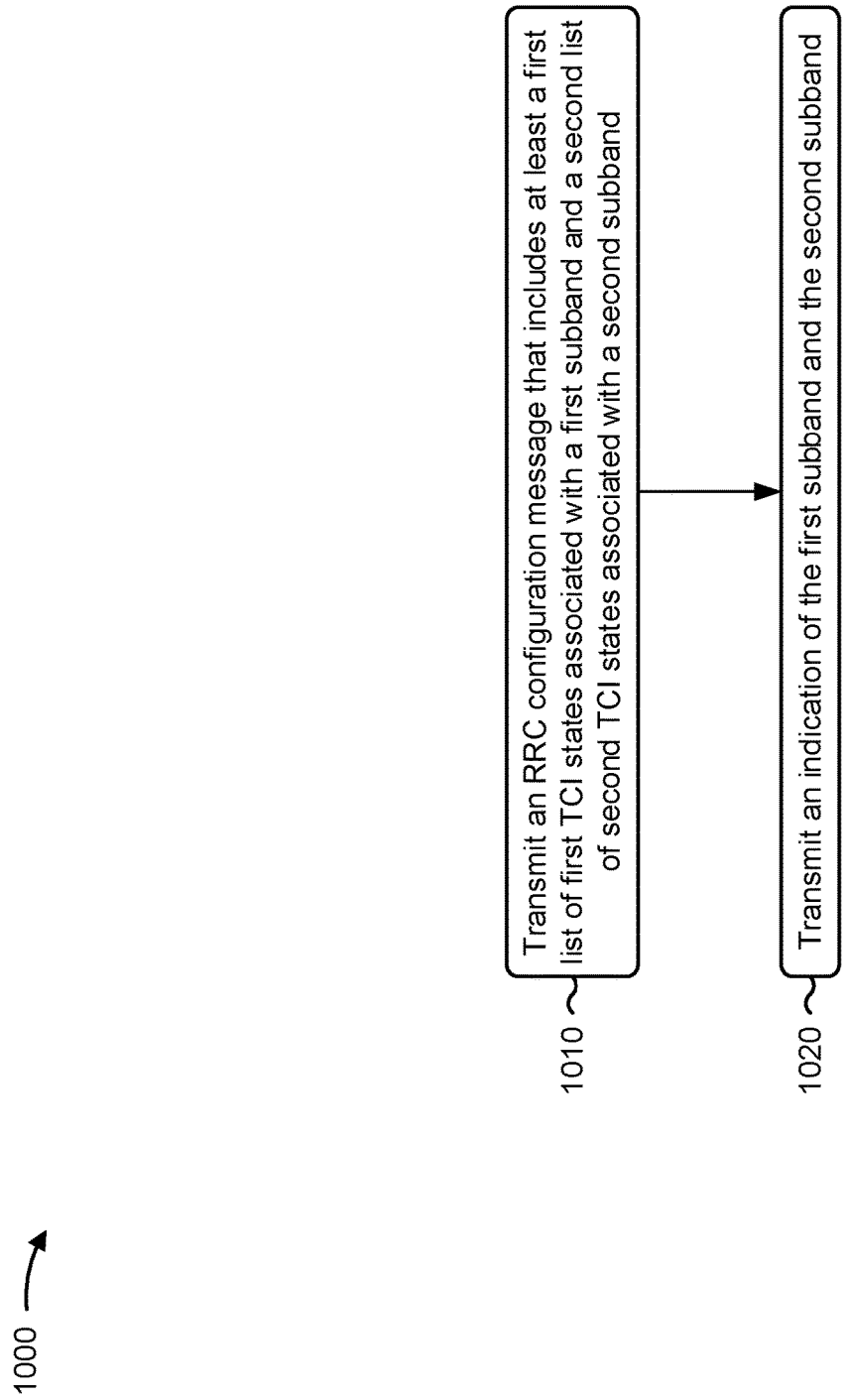

FIG. 10 is a diagram illustrating an example process 1000 performed, for example, by a base station, in accordance with the present disclosure. Example process 1000 is an example where the base station (e.g., base station 110 and/or apparatus 1200 of FIG. 12) performs operations associated with TCI states for subbands.

As shown in FIG. 10, in some aspects, process 1000 may include transmitting, to a UE (e.g., UE 120 and/or apparatus 1100 of FIG. 11), an RRC configuration message that includes at least a first list of first TCI states associated with a first subband and a second list of second TCI states associated with a second subband (block 1010). For example, the base station (e.g., using communication manager 150 and/or transmission component 1204, depicted in FIG. 12) may transmit, to a UE, an RRC configuration message that includes at least a first list of first TCI states associated with a first subband and a second list of second TCI states associated with a second subband, as described herein.

As further shown in FIG. 10, in some aspects, process 1000 may include transmitting, to the UE, an indication of the first subband and the second subband (block 1020). For example, the base station (e.g., using communication manager 150 and/or transmission component 1204) may transmit, to the UE, an indication of the first subband and the second subband, as described herein.

Process 1000 may include additional aspects, such as any single aspect or any combination of aspects described below and/or in connection with one or more other processes described elsewhere herein.

In a first aspect, the first TCI states are associated with a control channel, the second TCI states are associated with the control channel, and the RRC configuration message further includes a third list of third TCI states associated with the first subband and associated with a data channel and includes a fourth list of fourth TCI states associated with the second subband and associated with the data channel.

In a second aspect, alone or in combination with the first aspect, a quantity of TCI states indicated by each list does not exceed a maximum quantity of TCI states.

In a third aspect, alone or in combination with one or more of the first and second aspects, a quantity of lists included in the RRC configuration message does not exceed a maximum quantity of subbands.

In a fourth aspect, alone or in combination with one or more of the first through third aspects, the indication of the first subband is included in the first TCI states, and the indication of the second subband is included in the second TCI states.

In a fifth aspect, alone or in combination with one or more of the first through fourth aspects, the indication of the first subband and the second subband is included in the RRC configuration message.

Figure 12:
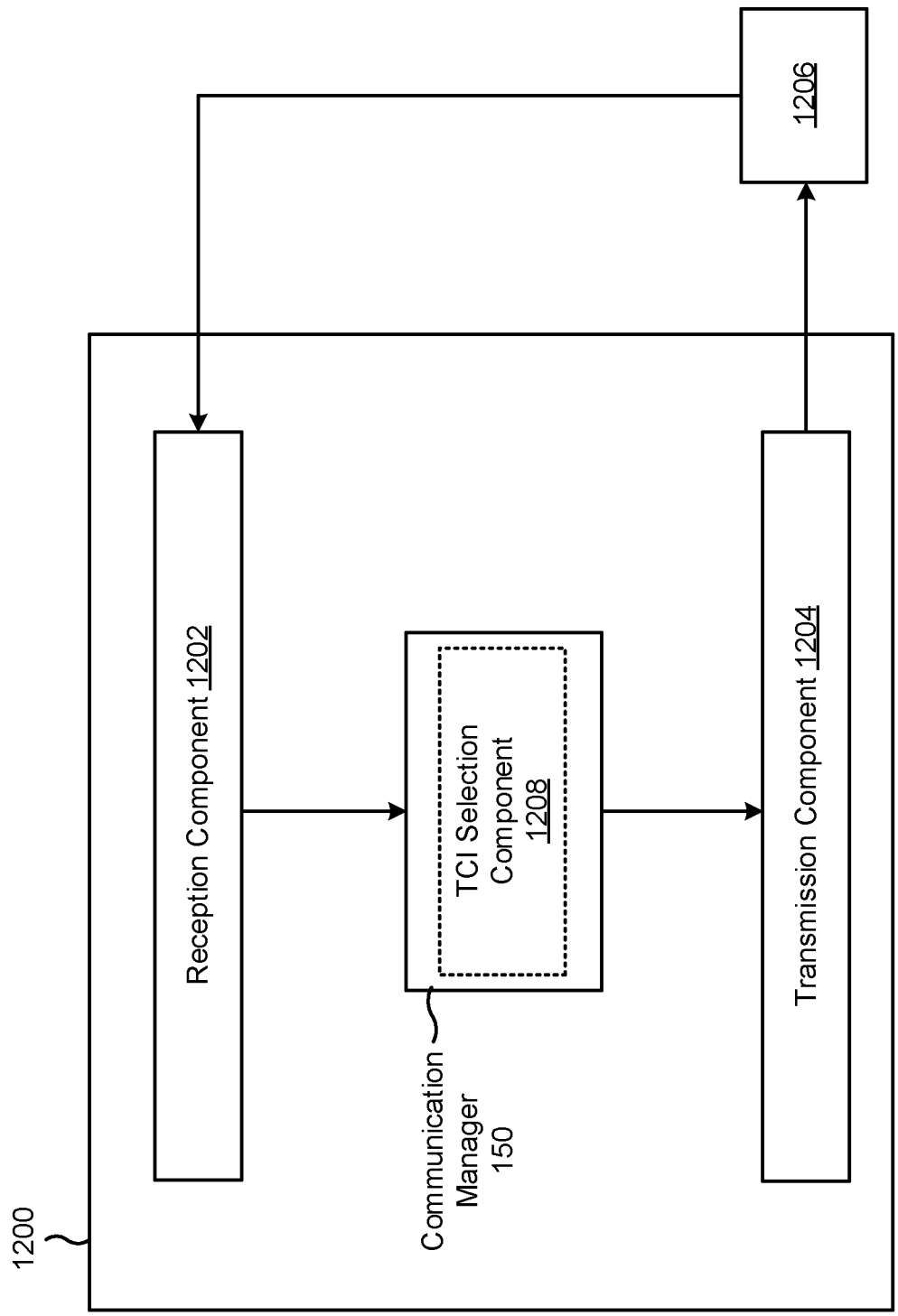

In a sixth aspect, alone or in combination with one or more of the first through fifth aspects, process 1000 further includes transmitting (e.g., using communication manager 150 and/or transmission component 1204, depicted in FIG. 12), to the UE, a control element that indicates a sublist of one or more first TCI states from the first list for use on the first subband.

In a seventh aspect, alone or in combination with one or more of the first through sixth aspects, the control element further indicates the first subband.

In an eighth aspect, alone or in combination with one or more of the first through seventh aspects, process 1000 further includes transmitting (e.g., using communication manager 150 and/or transmission component 1204, depicted in FIG. 12), to the UE, control information that indicates a TCI state within the sublist for use on the first subband.

In a ninth aspect, alone or in combination with one or more of the first through eighth aspects, the control information further indicates the first subband.

In a tenth aspect, alone or in combination with one or more of the first through ninth aspects, process 1000 further includes transmitting (e.g., using communication manager 150 and/or transmission component 1204, depicted in FIG. 12), to the UE, a control element that indicates a sublist of one or more first TCI states from the first list, one or more second TCI states from the second list, or a combination thereof, for use on the first subband or the second subband.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
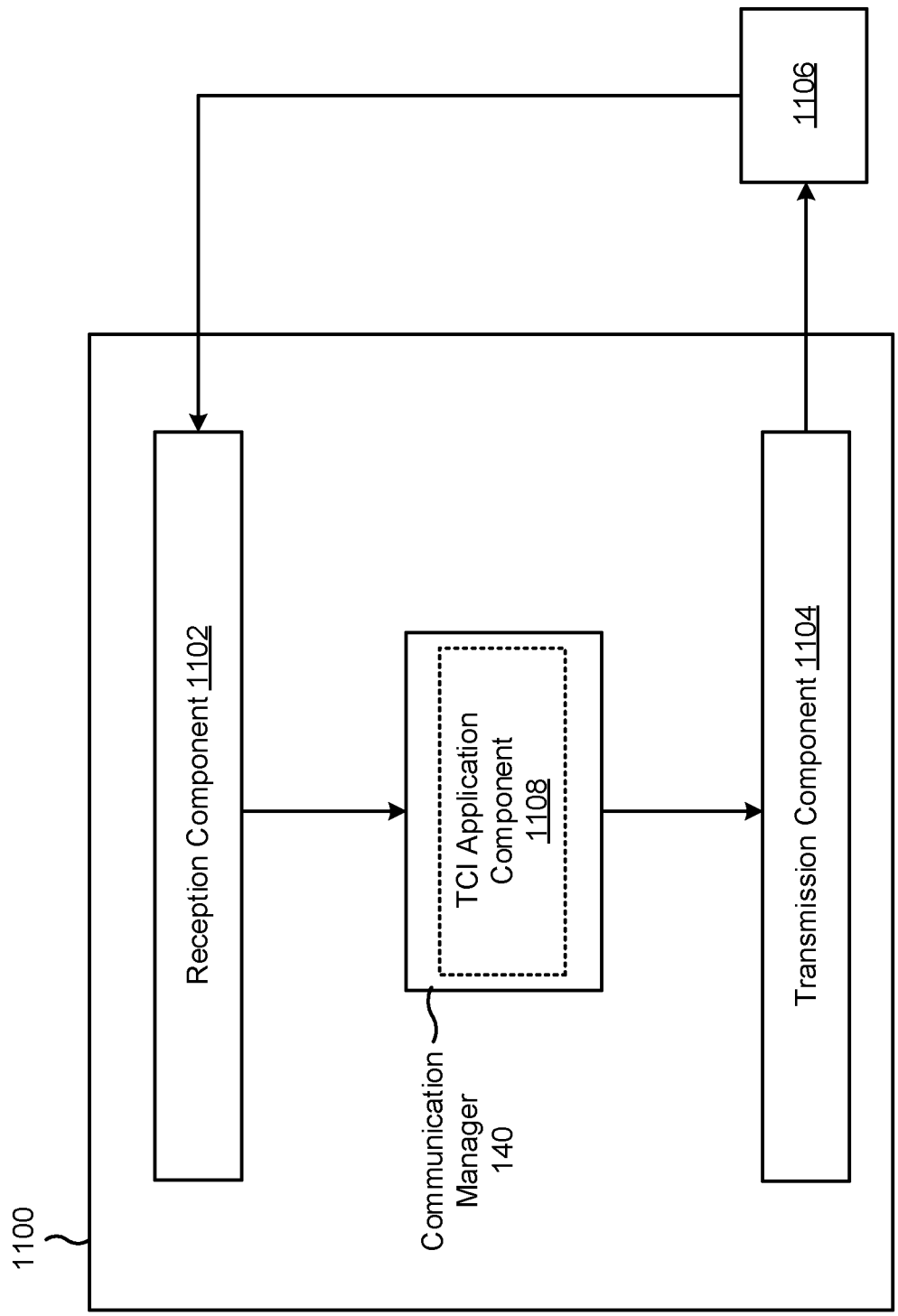
FIGS. 11 and 12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a TCI application component 1108, among other examples.

In some aspects, the apparatus 1100 may be configured to perform one or more operations described herein in connection with FIGS. 5-6. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

In some aspects, the reception component 1102 may receive (e.g., from the apparatus 1106) a first RRC configuration message that is associated with a first subband included in a wideband channel between the apparatus 1100 and the apparatus 1106 and that indicates a first set of TCI states for use on the first subband. The reception component 1102 may additionally receive (e.g., from the apparatus 1106) a second RRC configuration message that is associated with a second subband included in the wideband channel and that indicates a second set of TCI states for use on the second subband. Accordingly, the TCI application component 1108 may apply a TCI state (e.g., by adjusting one or more physical properties associated with the reception component 1102 and/or the transmission component 1104) from the first set or the second set based at least in part on whether the apparatus 1100 and/or the apparatus 1106 is using the first subband or the second subband.

In some aspects, the reception component 1102 may further receive (e.g., from the apparatus 1106) one or more additional RRC configuration messages, where each additional RRC configuration message is associated with an additional subband and indicates an additional set of TCI states for use on the additional subband. Accordingly, the TCI application component 1108 may apply a TCI state (e.g., by adjusting one or more physical properties associated with the reception component 1102 and/or the transmission component 1104) from an additional set of TCI states when the apparatus 1100 and/or the apparatus 1106 is using the additional subset corresponding to the additional set of TCI states.

In some aspects, the reception component 1102 may receive (e.g., from the apparatus 1106) a control element that indicates a subset of the first set of TCI states for use on the first subband. Accordingly, the TCI application component 1108 may apply a TCI state from the subset. In some aspects, the reception component 1102 may further receive (e.g., from the apparatus 1106) control information that indicates a TCI state within the subset of the first set of TCI states for use on the first subband. Accordingly, the TCI application component 1108 may apply the indicated TCI state.

In some aspects, the reception component 1102 may receive (e.g., from the apparatus 1106) a control element that indicates a subset of the first set of TCI states, the second set of TCI states, or a combination thereof, for use on the first subband or the second subband. Accordingly, the TCI application component 1108 may apply a TCI state from the subset. In some aspects, the reception component 1102 may further receive (e.g., from the apparatus 1106) control information that indicates a TCI state within the subset and that indicates the first subband. Accordingly, the TCI application component 1108 may apply the indicated TCI state.

As an alternative, the reception component 1102 may receive (e.g., from the apparatus 1106) an RRC configuration message that includes at least a first list of first TCI states associated with a first subband and a second list of second TCI states associated with a second subband. Additionally, the reception component 1102 may receive (e.g., from the apparatus 1106) an indication of the first subband and the second subband. Accordingly, the TCI application component 1108 may apply a TCI state (e.g., by adjusting one or more physical properties associated with the reception component 1102 and/or the transmission component 1104) from the first list or the second list based at least in part on whether the apparatus 1100 and/or the apparatus 1106 is using the first subband or the second subband.

In some aspects, the reception component 1102 may receive (e.g., from the apparatus 1106) a control element that indicates a sublist of one or more first TCI states from the first list for use on the first subband. Accordingly, the TCI application component 1108 may apply a TCI state from the sublist. In some aspects, the reception component 1102 may further receive (e.g., from the apparatus 1106) control information that indicates a TCI state within the sublist for use on the first subband. Accordingly, the TCI application component 1108 may apply the indicated TCI state.

In some aspects, the reception component 1102 may receive (e.g., from the apparatus 1106) a control element that indicates a sublist of one or more first TCI states from the first list, one or more second TCI states from the second list, or a combination thereof, for use on the first subband or the second subband. Accordingly, the TCI application component 1108 may apply a TCI state from the sublist. In some aspects, the reception component 1102 may further receive (e.g., from the apparatus 1106) control information that indicates a TCI state within the sublist and that indicates the first subband. Accordingly, the TCI application component 1108 may apply the indicated TCI state.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a TCI selection component 1208, among other examples.

In some aspects, the apparatus 1200 may be configured to perform one or more operations described herein in connection with FIGS. 5-6. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

In some aspects, the transmission component 1204 may transmit (e.g., to the apparatus 1206) a first RRC configuration message that is associated with a first subband included in a wideband channel between the apparatus 1200 and the apparatus 1206 and that indicates a first set of TCI states for use on the first subband. For example, the TCI selection component 1208 may select the first set of TCI states for the first subband based at least in part on measurements associated with the first set of TCI states by the apparatus 1200, the apparatus 1206, and/or another apparatus. The transmission component 1204 may further transmit (e.g., to the apparatus 1206) a second RRC configuration message that is associated with a second subband included in the wideband channel and that indicates a second set of TCI states for use on the second subband. For example, the TCI selection component 1208 may select the second set of TCI states for the second subband based at least in part on measurements associated with the second set of TCI states by the apparatus 1200, the apparatus 1206, and/or another apparatus.

In some aspects, the transmission component 1204 may further transmit (e.g., to the apparatus 1206) one or more additional RRC configuration messages, where each additional RRC configuration message is associated with an additional subband and indicates an additional set of TCI states for use on the additional subband. For example, the TCI selection component 1208 may select one or more additional sets of TCI states for the additional subband(s) based at least in part on measurements associated with the additional set(s) of TCI states by the apparatus 1200, the apparatus 1206, and/or another apparatus.

In some aspects, the transmission component 1204 may transmit (e.g., to the apparatus 1206) a control element that indicates a subset of the first set of TCI states for use on the first subband. For example, the TCI selection component 1208 may select the subset of the first set of TCI states based at least in part on measurements associated with the subset by the apparatus 1200, the apparatus 1206, and/or another apparatus. In some aspects, the transmission component 1204 may further transmit (e.g., to the apparatus 1206) control information that indicates a TCI state within the subset of the first set of TCI states for use on the first subband. For example, the TCI selection component 1208 may select the TCI state within the subset based at least in part on measurements associated with the TCI state by the apparatus 1200, the apparatus 1206, and/or another apparatus.

In some aspects, the transmission component 1204 may transmit (e.g., to the apparatus 1206) a control element that indicates a subset of the first set of TCI states, the second set of TCI states, or a combination thereof, for use on the first subband or the second subband. For example, the TCI selection component 1208 may select the subset based at least in part on measurements associated with the subset by the apparatus 1200, the apparatus 1206, and/or another apparatus. In some aspects, the transmission component 1204 may further transmit (e.g., to the apparatus 1206)

control information that indicates a TCI state within the subset and that indicates the first subband. For example, the TCI selection component 1208 may select the TCI state within the subset based at least in part on measurements associated with the TCI state by the apparatus 1200, the apparatus 1206, and/or another apparatus.

As an alternative, the transmission component 1204 may transmit (e.g., to the apparatus 1206) an RRC configuration message that includes at least a first list of first TCI states associated with a first subband and a second list of second TCI states associated with a second subband. For example, the TCI selection component 1208 may select the first set of TCI states for the first subband based at least in part on measurements associated with the first set of TCI states by the apparatus 1200, the apparatus 1206, and/or another apparatus, and select the second set of TCI states for the second subband based at least in part on measurements associated with the second set of TCI states by the apparatus 1200, the apparatus 1206, and/or another apparatus. The transmission component 1204 may further transmit (e.g., to the apparatus 1206) an indication of the first subband and the second subband.

In some aspects, the transmission component 1204 may transmit (e.g., to the apparatus 1206) a control element that indicates a sublist of one or more first TCI states from the first list for use on the first subband. For example, the TCI selection component 1208 may select the sublist of one or more first TCI states based at least in part on measurements associated with the first TCI state(s) by the apparatus 1200, the apparatus 1206, and/or another apparatus. In some aspects, the transmission component 1204 may further transmit (e.g., to the apparatus 1206) control information that indicates a TCI state within the sublist for use on the first subband. For example, the TCI selection component 1208 may select the TCI state within the sublist based at least in part on measurements associated with the TCI state by the apparatus 1200, the apparatus 1206, and/or another apparatus.

In some aspects, the transmission component 1204 may transmit (e.g., to the apparatus 1206) a control element that indicates a sublist of one or more first TCI states from the first list, one or more second TCI states from the second list, or a combination thereof, for use on the first subband or the second subband. For example, the TCI selection component 1208 may select the sublist based at least in part on measurements associated with the sublist by the apparatus 1200, the apparatus 1206, and/or another apparatus. In some aspects, the transmission component 1204 may further transmit (e.g., to the apparatus 1206) control information that indicates a TCI state within the sublist and that indicates the first subband. For example, the TCI selection component 1208 may select the TCI state within the sublist based at least in part on measurements associated with the TCI state by the apparatus 1200, the apparatus 1206, and/or another apparatus.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, a first radio resource control (RRC) configuration message that is associated with a first subband included in a wideband channel between the UE and the base station and that indicates a first set of transmission configuration indicator (TCI) states for use on the first subband; and receiving, from the base station, a second RRC configuration message that is associated with a second subband included in the wideband channel and that indicates a second set of TCI states for use on the second subband.

Aspect 2: The method of Aspect 1, wherein the first set of TCI states comprises one or more TCI states associated with a control channel and one or more additional TCI states associated with a data channel.

Aspect 3: The method of any of Aspects 1 through 2, wherein a quantity of TCI states indicated by each RRC configuration message does not exceed a maximum quantity of TCI states.

Aspect 4: The method of any of Aspects 1 through 3, further comprising: receiving, from the base station, one or more additional RRC configuration messages, wherein each additional RRC configuration message is associated with an additional subband and indicates an additional set of TCI states for use on the additional subband, wherein a quantity of RRC configuration messages does not exceed a maximum quantity of subbands.

Aspect 5: The method of any of Aspects 1 through 4, further comprising: receiving, from the base station, a control element that indicates a subset of the first set of TCI states for use on the first subband.

Aspect 6: The method of Aspect 5, further comprising: receiving, from the base station, control information that indicates a TCI state within the subset of the first set of TCI states for use on the first subband.

Aspect 7: The method of any of Aspects 1 through 4, further comprising: receiving, from the base station, a control element that indicates a subset of the first set of TCI states, the second set of TCI states, or a combination thereof, for use on the first subband or the second subband.

Aspect 8: The method of Aspect 7, wherein the subset indicated by the control element is further selected from one or more additional sets of TCI states, for use on one or more additional subbands associated with the one or more additional sets of TCI states.

Aspect 9: The method of any of Aspects 7 through 8, further comprising: receiving, from the base station, control information that indicates a TCI state within the subset and that indicates the first subband.

Aspect 10: A method of wireless communication performed by a base station, comprising: transmitting, to a user equipment (UE), a first radio resource control (RRC) configuration message that is associated with a first subband included in a wideband channel between the UE and the base station and that indicates a first set of transmission configuration indicator (TCI) states for use on the first subband; and transmitting, to the UE, a second RRC configuration message that is associated with a second subband included in the wideband channel and that indicates a second set of TCI states for use on the second subband.

Aspect 11: The method of Aspect 10, wherein the first set of TCI states comprises one or more TCI states associated with a control channel and one or more additional TCI states associated with a data channel.

Aspect 12: The method of any of Aspects 10 through 11, wherein a quantity of TCI states indicated by each RRC configuration message does not exceed a maximum quantity of TCI states.

Aspect 13: The method of any of Aspects 10 through 12, further comprising: transmitting, to the UE, one or more additional RRC configuration messages, wherein each additional RRC configuration message is associated with an additional subband and indicates an additional set of TCI states for use on the additional subband, wherein a quantity of RRC configuration messages does not exceed a maximum quantity of subbands.

Aspect 14: The method of any of Aspects 10 through 13, further comprising: transmitting, to the UE, a control element that indicates a subset of the first set of TCI states for use on the first subband.

Aspect 15: The method of Aspect 14, further comprising: transmitting, to the UE, control information that indicates a TCI state within the subset of the first set of TCI states for use on the first subband.

Aspect 16: The method of any of Aspects 10 through 13, further comprising: transmitting, to the UE, a control element that indicates a subset of the first set of TCI states, the second set of TCI states, or a combination thereof, for use on the first subband or the second subband.

Aspect 17: The method of Aspect 16, wherein the subset indicated by the control element is further selected from one or more additional sets of TCI states, for use on one or more additional subbands associated with the one or more additional sets of TCI states.

Aspect 18: The method of any of Aspects 16 through 17, further comprising: transmitting, to the UE, control information that indicates a TCI state within the subset and that indicates the first subband.

Aspect 19: A method of wireless communication performed by a user equipment (UE), comprising: receiving, from a base station, a radio resource control (RRC) configuration message that includes at least a first list of first transmission configuration indicator (TCI) states associated with a first subband and a second list of second TCI states associated with a second subband; and receiving, from the base station, an indication of the first subband and the second subband.

Aspect 20: The method of Aspect 19, wherein the first TCI states are associated with a control channel, the second TCI states are associated with the control channel, and the RRC configuration message further includes a third list of third TCI states associated with the first subband and associated with a data channel and includes a fourth list of fourth TCI states associated with the second subband and associated with the data channel.

Aspect 21: The method of any of Aspects 19 through 20, wherein a quantity of TCI states indicated by each list does not exceed a maximum quantity of TCI states.

Aspect 22: The method of any of Aspects 19 through 21, wherein a quantity of lists included in the RRC configuration message does not exceed a maximum quantity of subbands.

Aspect 23: The method of any of Aspects 19 through 22, wherein the indication of the first subband is included in the first TCI states, and the indication of the second subband is included in the second TCI states.

Aspect 24: The method of any of Aspects 19 through 23, wherein the indication of the first subband and the second subband is included in the RRC configuration message.

Aspect 25: The method of any of Aspects 19 through 24, further comprising: receiving, from the base station, a control element that indicates a sublist of one or more first TCI states from the first list for use on the first subband.

Aspect 26: The method of Aspect 25, wherein the control element further indicates the first subband.

Aspect 27: The method of any of Aspects 25 through 26, further comprising: receiving, from the base station, control information that indicates a TCI state within the sublist for use on the first subband.

Aspect 28: The method of Aspect 27, wherein the control information further indicates the first subband.

Aspect 29: The method of any of Aspects 19 through 24, further comprising: receiving, from the base station, a control element that indicates a sublist of one or more first TCI states from the first list, one or more second TCI states from the second list, or a combination thereof, for use on the first subband or the second subband.

Aspect 30: The method of Aspect 29, wherein the control element further indicates the first subband.

Aspect 31: The method of any of Aspects 29 through 30, further comprising: receiving, from the base station, control information that indicates a TCI state within the sublist and that indicates the first subband.

Aspect 32: The method of any of Aspects 29 through 31, wherein the sublist indicated by the control element is further selected from one or more additional lists of TCI states, for use on one or more additional subbands associated with the one or more additional lists of TCI states.

Aspect 33: A method of wireless communication performed by a base station, comprising: transmitting, to a user equipment (UE), a radio resource control (RRC) configuration message that includes at least a first list of first transmission configuration indicator (TCI) states associated with a first subband and a second list of second TCI states associated with a second subband; and transmitting, to the UE, an indication of the first subband and the second subband.

Aspect 34: The method of Aspect 33, wherein the first TCI states are associated with a control channel, the second TCI states are associated with the control channel, and the RRC configuration message further includes a third list of third TCI states associated with the first subband and associated with a data channel and includes a fourth list of fourth TCI states associated with the second subband and associated with the data channel.

Aspect 35: The method of any of Aspects 33 through 34, wherein a quantity of TCI states indicated by each list does not exceed a maximum quantity of TCI states.

Aspect 36: The method of any of Aspects 33 through 35, wherein a quantity of lists included in the RRC configuration message does not exceed a maximum quantity of subbands.

Aspect 37: The method of any of Aspects 33 through 36, wherein the indication of the first subband is included in the first TCI states, and the indication of the second subband is included in the second TCI states.

Aspect 38: The method of any of Aspects 33 through 37, wherein the indication of the first subband and the second subband is included in the RRC configuration message.

Aspect 39: The method of any of Aspects 33 through 38, further comprising: transmitting, to the UE, a control element that indicates a sublist of one or more first TCI states from the first list for use on the first subband.

Aspect 40: The method of Aspect 39, wherein control element further indicates the first subband.

Aspect 41: The method of any of Aspects 39 through 40, further comprising: transmitting, to the UE, control information that indicates a TCI state within the sublist for use on the first subband.

Aspect 42: The method of Aspect 41, wherein control information further indicates the first subband.

Aspect 43: The method of any of Aspects 33 through 38, further comprising: transmitting, to the UE, a control element that indicates a sublist of one or more first TCI states from the first list, one or more second TCI states from the second list, or a combination thereof, for use on the first subband or the second subband.

Aspect 44: The method of Aspect 43, wherein control information further indicates the first subband.

Aspect 45: The method of any of Aspects 43 through 44, further comprising: transmitting, to the UE, control information that indicates a TCI state within the sublist and that indicates the first subband.

Aspect 46: The method of any of Aspects 43 through 45, wherein the sublist indicated by the control element is further selected from one or more additional lists of TCI states, for use on one or more additional subbands associated with the one or more additional lists of TCI states.

Aspect 47: An apparatus for wireless communication at a device, comprising a processor; memory coupled with the processor; and instructions stored in the memory and executable by the processor to cause the apparatus to perform the method of one or more of Aspects 1-9.

Aspect 48: A device for wireless communication, comprising a memory and one or more processors coupled to the memory, the one or more processors configured to perform the method of one or more of Aspects 1-9.

Aspect 49: An apparatus for wireless communication, comprising at least one means for performing the method of one or more of Aspects 1-9.

Aspect 50: A non-transitory computer-readable medium storing code for wireless communication, the code comprising instructions executable by a processor to perform the method of one or more of Aspects 1-9.

Aspect 51: A non-transitory computer-readable medium storing a set of instructions for wireless communication, the set of instructions comprising one or more instructions that, when executed by one or more processors of a device, cause the device to perform the method of one or more of Aspects 1-9.

Aspect 52: An apparatus for wireless communication at a device, comprising a processor; memory coupled with the processor; and instructions stored in the memory and executable by the processor to cause the apparatus to perform the method of one or more of Aspects 10-18.

Aspect 53: A device for wireless communication, comprising a memory and one or more processors coupled to the memory, the one or more processors configured to perform the method of one or more of Aspects 10-18.

Aspect 54: An apparatus for wireless communication, comprising at least one means for performing the method of one or more of Aspects 10-18.

Aspect 55: A non-transitory computer-readable medium storing code for wireless communication, the code comprising instructions executable by a processor to perform the method of one or more of Aspects 10-18.

Aspect 56: A non-transitory computer-readable medium storing a set of instructions for wireless communication, the set of instructions comprising one or more instructions that, when executed by one or more processors of a device, cause the device to perform the method of one or more of Aspects 10-18.

Aspect 57: An apparatus for wireless communication at a device, comprising a processor; memory coupled with the processor; and instructions stored in the memory and executable by the processor to cause the apparatus to perform the method of one or more of Aspects 19-32.

Aspect 58: A device for wireless communication, comprising a memory and one or more processors coupled to the memory, the one or more processors configured to perform the method of one or more of Aspects 19-32.

Aspect 59: An apparatus for wireless communication, comprising at least one means for performing the method of one or more of Aspects 19-32.

Aspect 60: A non-transitory computer-readable medium storing code for wireless communication, the code comprising instructions executable by a processor to perform the method of one or more of Aspects 19-32.

Aspect 61: A non-transitory computer-readable medium storing a set of instructions for wireless communication, the set of instructions comprising one or more instructions that, when executed by one or more processors of a device, cause the device to perform the method of one or more of Aspects 19-32.

Aspect 62: An apparatus for wireless communication at a device, comprising a processor; memory coupled with the processor; and instructions stored in the memory and executable by the processor to cause the apparatus to perform the method of one or more of Aspects 33-46.

Aspect 63: A device for wireless communication, comprising a memory and one or more processors coupled to the memory, the one or more processors configured to perform the method of one or more of Aspects 33-46.

Aspect 64: An apparatus for wireless communication, comprising at least one means for performing the method of one or more of Aspects 33-46.

Aspect 65: A non-transitory computer-readable medium storing code for wireless communication, the code comprising instructions executable by a processor to perform the method of one or more of Aspects 33-46.

Aspect 66: A non-transitory computer-readable medium storing a set of instructions for wireless communication, the set of instructions comprising one or more instructions that, when executed by one or more processors of a device, cause the device to perform the method of one or more of Aspects 33-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the team "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    one or more memories; and
    one or more processors coupled to the one or more memories, the one or more memories storing instructions executable by the one or more processors to cause the UE to:
        receive, from a base station, a radio resource control (RRC) configuration message that configures:
            for a first subband included in a wideband channel between the UE and the base station, a first transmission configuration indicator (TCI) state for use on the first subband; and
            for a second subband included in the wideband channel, a second TCI state for use on the second subband.

2. The apparatus of claim 1, wherein the first TCI state is associated with a control channel and the second TCI state is associated with a data channel.

3. The apparatus of claim 1, wherein a quantity of TCI states indicated by the RRC configuration message does not exceed a maximum quantity of TCI states.

4. The apparatus of claim 1, wherein the one or more memories further comprise instructions executable by the one or more processors to cause the UE to:
    receive, from the base station, one or more additional RRC configuration messages, wherein each additional RRC configuration message is associated with an additional subband and indicates a set of TCI states for use on the additional subband,
    wherein a quantity of RRC configuration messages does not exceed a maximum quantity of subbands.

5. The apparatus of claim 1, wherein the one or more memories further comprise instructions executable by the one or more processors to cause the UE to:
    receive, from the base station, a control element that indicates the first TCI state for use on the first subband.

6. The apparatus of claim 5, wherein the one or more memories further comprise instructions executable by the one or more processors to cause the UE to:
    receive, from the base station, a communication using the first TCI state on the first subband.

7. The apparatus of claim 1, wherein the one or more memories further comprise instructions executable by the one or more processors to cause the UE to:
    receive, from the base station, a control element that indicates the first TCI state, the second TCI state, or a combination thereof, for use on the first subband or the second subband.

8. The apparatus of claim 7, wherein the one or more memories further comprise instructions executable by the one or more processors to cause the UE to:
    receive, from the base station, a communication using the first TCI state or the second TCI state.

9. The apparatus of claim 7, wherein the first TCI state or the second TCI state indicated by the control element is further selected from one or more additional sets of TCI states, for use on one or more additional subbands associated with the one or more additional sets of TCI states.

10. An apparatus for wireless communication at a base station, comprising:
    one or more memories; and
    one or more processors coupled to the one or more memories, the one or more memories storing instructions executable by the one or more processors to cause the base station to:
        transmit, to a user equipment (UE), a radio resource control (RRC) configuration message that indicates:
            for a first subband included in a wideband channel between the UE and the base station, a first transmission configuration indicator (TCI) state for use on the first subband; and
            for a second subband included in the wideband channel, a second TCI state for use on the second subband.

11. The apparatus of claim 10, wherein the one or more memories further comprise instructions executable by the one or more processors to cause the base station to:
    transmit, to the UE, one or more additional RRC configuration messages, wherein each additional RRC configuration message is associated with an additional subband and indicates a set of TCI states for use on the additional subband,
    wherein a quantity of RRC configuration messages does not exceed a maximum quantity of subbands.

12. The apparatus of claim 10, wherein the one or more memories further comprise instructions executable by the one or more processors to cause the base station to:

transmit, to the UE, a control element that indicates the first TCI state for use on the first subband.

13. The apparatus of claim 12, wherein the one or more memories further comprise instructions executable by the one or more processors to cause the base station to:
   transmit, to the UE, a communication using the first TCI state on the first subband.

14. The apparatus of claim 10, wherein the one or more memories further comprise instructions executable by the one or more processors to cause the base station to:
   transmit, to the UE, a control element that indicates the first TCI state, the second TCI state, or a combination thereof, for use on the first subband or the second subband.

15. The apparatus of claim 14, wherein the one or more memories further comprise instructions executable by the one or more processors to cause the base station to:
   transmit, to the UE, a communication using the first TCI state or the second TCI state.

16. The apparatus of claim 14, wherein the first TCI state or the second TCI state indicated by the control element is further selected from one or more additional sets of TCI states, for use on one or more additional subbands associated with the one or more additional sets of TCI states.

17. An apparatus for wireless communication at a user equipment (UE), comprising:
   one or more memories; and
   one or more processors coupled to the one or more memories, the one or more memories storing instructions executable by the one or more processors to cause the UE to:
      receive, from a base station, a radio resource control (RRC) configuration message that includes at least a first list of first transmission configuration indicator (TCI) states associated with a first subband of a wideband channel between the UE and the base station and a second list of second TCI states associated with a second subband of the wideband channel; and
      receive, from the base station, an indication of the first subband and the second subband.

18. The apparatus of claim 17, wherein the first TCI states are associated with a control channel, the second TCI states are associated with the control channel, and the RRC configuration message further includes a third list of third TCI states associated with the first subband and associated with a data channel and includes a fourth list of fourth TCI states associated with the second subband and associated with the data channel.

19. The apparatus of claim 17, wherein a quantity of TCI states indicated by each list does not exceed a maximum quantity of TCI states.

20. The apparatus of claim 17, wherein a quantity of lists included in the RRC configuration message does not exceed a maximum quantity of subbands.

21. The apparatus of claim 17, wherein the indication of the first subband is included in the first TCI states, and the indication of the second subband is included in the second TCI states.

22. The apparatus of claim 17, wherein the indication of the first subband and the second subband is included in the RRC configuration message.

23. The apparatus of claim 17, wherein the one or more memories further comprises instructions executable by the one or more processors to cause the UE to:
   receive, from the base station, a control element that indicates a sublist of one or more first TCI states from the first list for use on the first subband.

24. The apparatus of claim 23, wherein the control element further indicates the first subband.

25. The apparatus of claim 23, wherein the one or more memories further comprises instructions executable by the one or more processors to cause the UE to:
   receive, from the base station, control information that indicates a TCI state within the sublist for use on the first subband.

26. The apparatus of claim 17, wherein the one or more memories further comprises instructions executable by the one or more processors to cause the UE to:
   receive, from the base station, a control element that indicates a sublist of one or more first TCI states from the first list, one or more second TCI states from the second list, or a combination thereof, for use on the first subband or the second subband.

27. The apparatus of claim 26, wherein the control element further indicates the first subband.

28. The apparatus of claim 26, wherein the one or more memories further comprises instructions executable by the one or more processors to cause the UE to:
   receive, from the base station, control information that indicates a TCI state within the sublist and that indicates the first subband.

29. The apparatus of claim 26, wherein the sublist indicated by the control element is further selected from one or more additional lists of TCI states, for use on one or more additional subbands associated with the one or more additional lists of TCI states.

30. An apparatus for wireless communication at a base station, comprising:
   one or more memories; and
   one or more processors coupled to the one or more memories, the one or more memories storing instructions executable by the one or more processors to cause the base station to:
      transmit, to a user equipment (UE), a radio resource control (RRC) configuration message that includes at least a first list of first transmission configuration indicator (TCI) states associated with a first subband of a wideband channel between the UE and the base station and a second list of second TCI states associated with a second subband of the wideband channel; and
      transmit, to the UE, an indication of the first subband and the second subband.

* * * * *